US012092529B2

United States Patent
Rodrigues et al.

(10) Patent No.: US 12,092,529 B2
(45) Date of Patent: Sep. 17, 2024

(54) WINDOW-BASED OBJECT DETECTION AND/OR IDENTIFICATION

(71) Applicant: Toyota Motor Engineering & Manufacturing North America, Inc., Plano, TX (US)

(72) Inventors: Sean P. Rodrigues, Ann Arbor, MI (US); Paul Donald Schmalenberg, Pittsburgh, PA (US); Ercan Mehmet Dede, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 345 days.

(21) Appl. No.: 17/536,821

(22) Filed: Nov. 29, 2021

(65) Prior Publication Data
US 2023/0168136 A1 Jun. 1, 2023

(51) Int. Cl.
*G01K 11/3206* (2021.01)
*G01K 1/02* (2021.01)
(Continued)

(52) U.S. Cl.
CPC .......... *G01K 11/3206* (2013.01); *G01K 1/02* (2013.01); *G01K 3/005* (2013.01); *G01K 5/52* (2013.01); *G01K 11/00* (2013.01)

(58) Field of Classification Search
CPC ...... G01K 11/3206; G01K 1/02; G01K 3/005; G01K 5/52; G01K 11/00
See application file for complete search history.

(56) References Cited

U.S. PATENT DOCUMENTS 5,399,854 A * 3/1995 Dunphy ................. G01K 5/72
374/E11.016
5,953,469 A * 9/1999 Zhou ..................... G02B 6/3522
385/22
(Continued)

FOREIGN PATENT DOCUMENTS

JP H07137589 A 5/1995
KR 101737737 A 5/2017
(Continued)

OTHER PUBLICATIONS

Moynihan, T.,"What Are Quantum Dots, and Why Do I Want Them in My TV?", Wired, Jan. 19, 2015, retrieved from the Internet: <https://www.wired.com/2015/01/primer-quantum-dot/>, [retrieved Nov. 18, 2021] (10 pages).
(Continued)

Primary Examiner — Nathaniel T Woodward
Assistant Examiner — Philip L Cotey
(74) Attorney, Agent, or Firm — Christopher G. Darrow; Darrow Mustafa PC

(57) ABSTRACT

A window can be used for object detection and/or identification. The window can have a first side and a second side. An optical grating can be operatively positioned with respect to the first side of the window. A light source can be configured to emit light toward the optical grating. A detector can be operatively positioned to acquire spectroscopic data of the light emitted from the light source after the light has interacted with the optical grating. Using the optical grating, a temperature at or near the first side can be determined. Based on the temperature, it can be determined whether an object is located on the first side of the window.

20 Claims, 14 Drawing Sheets

(51) Int. Cl.
*G01K 3/00* (2006.01)
*G01K 5/52* (2006.01)
*G01K 11/00* (2006.01)

(56) References Cited

U.S. PATENT DOCUMENTS

| | | | |
|---|---|---|---|
| 7,193,666 B2 | 3/2007 | Choi et al. | |
| 7,542,635 B2* | 6/2009 | Coleman | G02B 6/0041 362/617 |
| 8,290,315 B2* | 10/2012 | Saunders | G01K 1/20 29/709 |
| 8,362,992 B2* | 1/2013 | Kuhlman | G02F 1/13306 345/204 |
| 8,964,298 B2 | 2/2015 | Haddick et al. | |
| 9,702,183 B1* | 7/2017 | Ochiai | B60J 3/007 |
| 9,707,913 B1* | 7/2017 | Ochiai | B60N 2/0248 |
| 9,855,890 B2* | 1/2018 | James | B60K 35/10 |
| 9,902,266 B2* | 2/2018 | Pisz | B60K 35/10 |
| 9,969,265 B2* | 5/2018 | Williams | E05B 81/70 |
| 10,065,504 B2* | 9/2018 | Ochiai | B60K 35/00 |
| 10,377,303 B2* | 8/2019 | McNew | B60W 50/14 |
| 10,449,898 B2* | 10/2019 | Sherony | B60Q 9/008 |
| 10,632,820 B2* | 4/2020 | Cosgrove | B60H 1/3208 |
| 10,777,078 B1* | 9/2020 | Murad | G08G 1/0967 |
| 11,089,239 B1* | 8/2021 | Murad | H04N 7/181 |
| 11,320,588 B1* | 5/2022 | Mazed | G16H 10/40 |
| 11,327,305 B2* | 5/2022 | Haussler | H04N 9/3185 |
| 11,359,841 B2* | 6/2022 | Raman | F24S 70/225 |
| 11,774,787 B2 | 10/2023 | Rodrigues | |
| 2003/0076487 A1* | 4/2003 | Cannon | G01N 33/386 356/33 |
| 2003/0210360 A1* | 11/2003 | Yoshida | G02F 1/13362 349/96 |
| 2005/0115308 A1* | 6/2005 | Koram | B32B 17/10174 73/73 |
| 2006/0272397 A1* | 12/2006 | Hawk | B60S 1/0822 73/73 |
| 2010/0159610 A1* | 6/2010 | Sun | G01N 21/78 436/147 |
| 2010/0221461 A1* | 9/2010 | Torr | B32B 17/10339 428/34 |
| 2010/0247027 A1* | 9/2010 | Xia | G01D 5/35303 385/12 |
| 2011/0043496 A1* | 2/2011 | Ray Avalani | G06F 1/163 345/204 |
| 2012/0162427 A1* | 6/2012 | Lynam | H04N 7/181 348/148 |
| 2012/0306940 A1 | 12/2012 | Machida et al. | |
| 2013/0127980 A1* | 5/2013 | Haddick | G06F 3/013 348/14.08 |
| 2014/0019005 A1* | 1/2014 | Lee | G08G 1/0962 701/301 |
| 2014/0369641 A1* | 12/2014 | Chiang | G01K 1/14 385/12 |
| 2015/0360565 A1* | 12/2015 | Goto | B60K 35/00 701/36 |
| 2016/0311323 A1* | 10/2016 | Lee | G06F 3/013 |
| 2016/0368418 A1* | 12/2016 | Suenaga | H04N 23/90 |
| 2017/0043720 A1* | 2/2017 | Shaw | B60R 1/28 |
| 2017/0297496 A1* | 10/2017 | Onaka | G06V 20/56 |
| 2018/0015879 A1* | 1/2018 | Kim | G08G 1/167 |
| 2018/0022278 A1* | 1/2018 | Parat | B60R 1/12 348/148 |
| 2018/0154831 A1* | 6/2018 | Spencer | H04N 5/2628 |
| 2018/0156953 A1* | 6/2018 | Li | G02F 1/133536 |
| 2018/0268701 A1* | 9/2018 | Sato | G02B 27/0101 |
| 2018/0330632 A1* | 11/2018 | Fonarov | A63H 30/04 |
| 2018/0334101 A1* | 11/2018 | Tschirhart | B60R 1/26 |
| 2018/0372554 A1* | 12/2018 | Laycock | G01N 21/643 |
| 2019/0009796 A1* | 1/2019 | Fujii | B60W 50/14 |
| 2019/0248122 A1* | 8/2019 | Gillessen | B32B 37/06 |
| 2019/0302523 A1 | 10/2019 | Okuyama | |
| 2019/0315275 A1* | 10/2019 | Kim | B60J 3/04 |
| 2019/0356508 A1* | 11/2019 | Trikha | G02F 1/1533 |
| 2019/0383672 A1* | 12/2019 | Liu | G01K 3/005 |
| 2020/0111489 A1* | 4/2020 | Kuramochi | B60K 35/22 |
| 2020/0249111 A1* | 8/2020 | Doyle | G01L 11/025 |
| 2021/0011300 A1* | 1/2021 | Leister | G02B 5/1833 |
| 2021/0026057 A1 | 1/2021 | Meng et al. | |
| 2021/0033857 A1* | 2/2021 | Waldern | G02B 6/005 |
| 2021/0039522 A1* | 2/2021 | Bove | B60N 2/0244 |
| 2021/0055548 A1* | 2/2021 | Rao | G02B 27/0101 |
| 2021/0165215 A1* | 6/2021 | Haussler | H04N 9/3185 |
| 2021/0181415 A1* | 6/2021 | Nichol | G02B 6/0016 |
| 2021/0300404 A1* | 9/2021 | Bruckmeier | B60K 35/25 |
| 2021/0341314 A1* | 11/2021 | Desmarchelier | G02B 6/02395 |
| 2021/0347374 A1* | 11/2021 | Stenneth | G01C 21/3655 |
| 2021/0389615 A1* | 12/2021 | Rodrigues | G02F 1/137 |
| 2021/0394793 A1* | 12/2021 | Austin | B60Q 1/5037 |
| 2022/0041105 A1* | 2/2022 | Jochmann | G06T 3/047 |
| 2022/0179148 A1* | 6/2022 | Coleman | G02B 6/0011 |
| 2022/0187521 A1* | 6/2022 | Toy | G02B 27/0101 |
| 2022/0283377 A1* | 9/2022 | Popovich | G02B 27/0103 |
| 2022/0283432 A1* | 9/2022 | Richards | B60K 35/50 |
| 2022/0310893 A1* | 9/2022 | Frei | H01L 33/62 |
| 2022/0382224 A1* | 12/2022 | Shrivastava | G02F 1/163 |
| 2022/0396148 A1 | 12/2022 | Rodrigues et al. | |
| 2022/0396205 A1 | 12/2022 | Rodrigues et al. | |
| 2022/0397464 A1 | 12/2022 | Rodrigues et al. | |

FOREIGN PATENT DOCUMENTS

| | | |
|---|---|---|
| TW | 202119805 A | 5/2021 |
| WO | 2019201554 A1 | 10/2019 |

OTHER PUBLICATIONS

Zhou, X. et al. "Full color waveguide liquid crystal display", Optics Letters, vol. 42, Issue 18, Sep. 15, 2017 (4 pages).
Klimov, N. et al., "On-Clip Silicon Waveguide Bragg Grating Photonic Temperature Sensor", Optics Letters, vol. 40, Issue 17, 2015 (4 pages).
Li, "Understanding Waveguide: the Key Technology for Augmented Reality Near-eye Display (Part I)", Virtual Reality Pop, Jun. 18, 2019, Retrieved from the Internet: <https://virtualrealitypop.com/understanding-waveguide-the-key-technology-for-augmented-reality-near-eye-display-part-i-2b16b61f4bae>, [retrieved Apr. 29, 2020] (10 pages).
U.S. Appl. No. 16/897,577.
Rodrigues et al., U.S. Appl. No. 17/343,824, filed Jun. 10, 2021.
Rodrigues et al., U.S. Appl. No. 17/536,753, filed Nov. 29, 2021.
Firth, "Creating vehicle-to-pedestrian communication using transparent window displays", retrieved from the Internet: <https://e2e.ti.com/blogs_/b/behind_the_wheel/posts/how-to-create-vehicle-to-pedestrian-communication-using-transparent-window-displays>, retrieved Mar. 23, 2023, dated Aug. 1, 2019 (6 pages).

* cited by examiner

400

```
Determine a temperature based on spectroscopic
data
410
```
↓
```
Determine, based on the temperature, whether an object
is located on the first side of the window
420
```

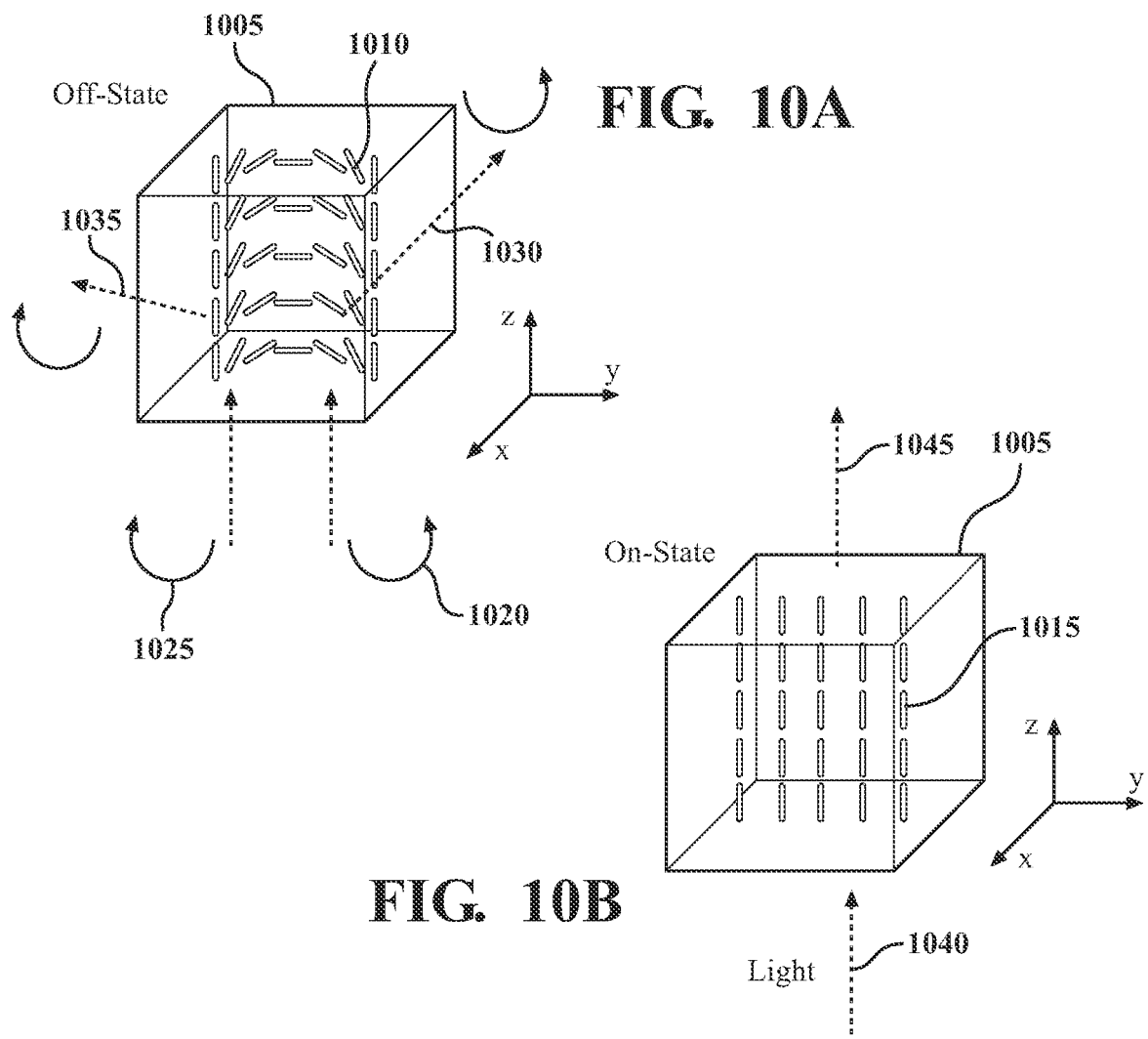
FIG. 10A
FIG. 10B
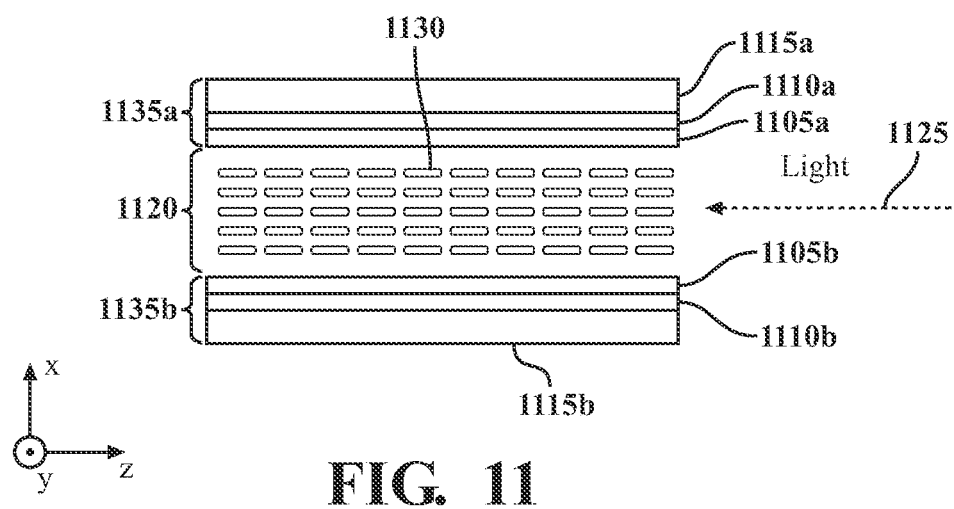
FIG. 11

WINDOW-BASED OBJECT DETECTION AND/OR IDENTIFICATION

FIELD

The subject matter described herein relates in general to object detection and/or identification and, more particularly, to object detection and/or identification in structures that include a window.

BACKGROUND

Various structures, including vehicles and buildings, can include various systems or components for determining a temperature inside and/or outside of the structure. For example, vehicles can include a temperature sensor located on the vehicle to measure the temperature of the external environment of the vehicle. In another example, buildings can include a thermostat for measuring the temperature inside the building.

SUMMARY

In one respect, the present disclosure is directed to a system for window-based object detection and/or identification. The system can include a window. The window can include a first side and a second side. The first side can be opposite the second side. The window can include an optical grating operatively positioned with respect to the first side. The system can include a light source configured to emit light toward the optical grating. The system can include a detector operatively positioned to acquire spectroscopic data of the light emitted from the light source after the light has interacted with the optical grating. The system can include a processor operatively connected to the detector. The processor can be configured to determine a temperature based on the spectroscopic data. The processor can be configured to determine, based on the temperature, whether an object on the first side of the window.

In another respect, the present disclosure is directed to a method for window-based object detection and/or identification. A window can have a first side and a second side. An optical grating can be operatively positioned with respect to the first side of the window. A light source can be configured to emit light toward the optical grating. A detector can be operatively positioned to acquire spectroscopic data of the light emitted from the light source after the light has interacted with the optical grating. The method can include determining, using the optical grating, a temperature at or near the first side. The method can also include determining, based on the temperature, whether an object is located on the first side of the window.

BRIEF DESCRIPTION OF THE DRAWINGS

FIGS. 10A and 10B are various aspects of a third embodiment of a dual-sided transparent display that can be used in connection with the window-based temperature determination system.

FIG. 11 is an example of the third embodiment of a dual-sided transparent display that can be used in connection with the window-based temperature determination system.

DETAILED DESCRIPTION

Figure 1:
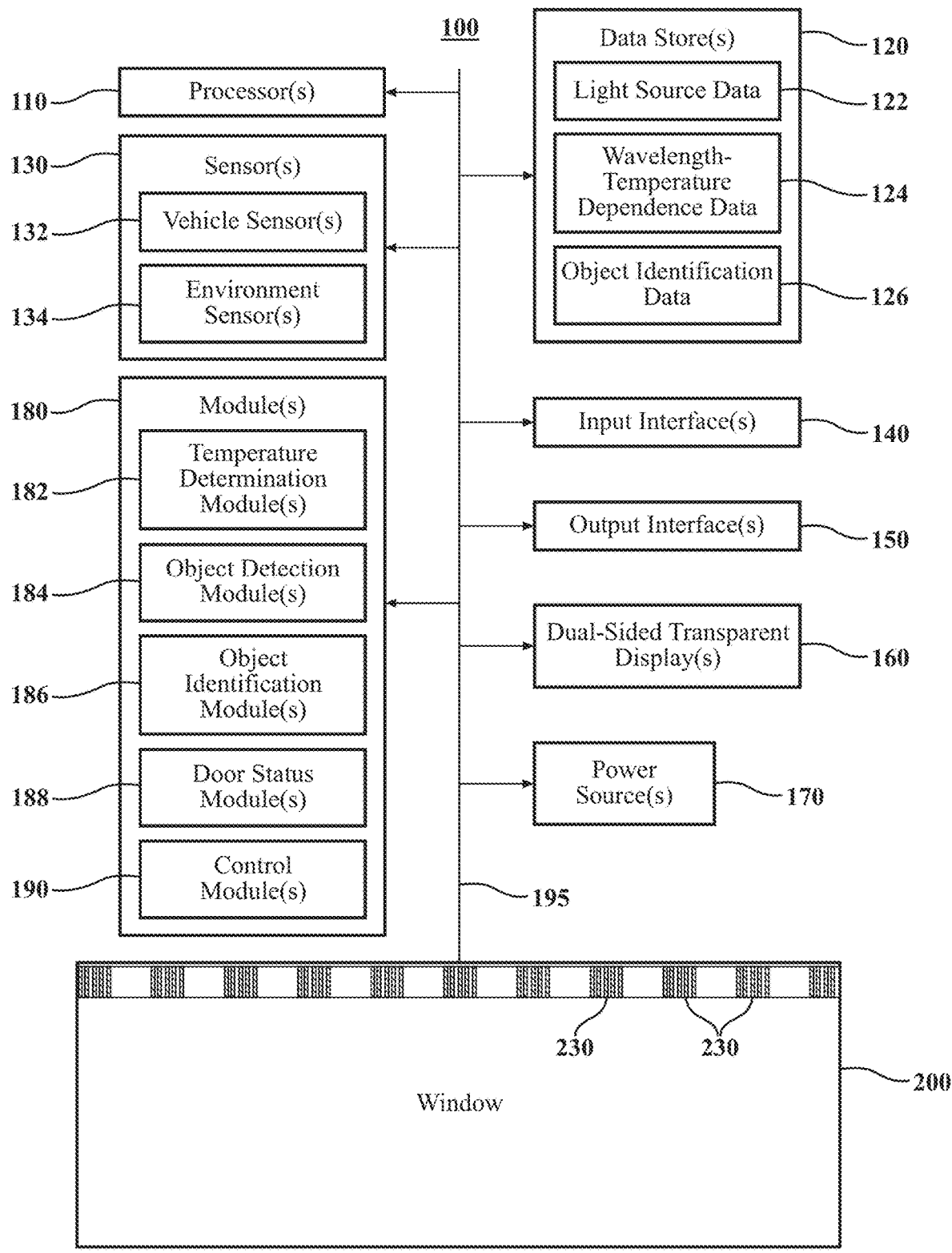
FIG. 1 is a window-based object detection and/or object identification system.

There are many structures that include a window. In some instance, a window can be integrated into a door. By their very nature, doors are designed to be opened and closed. When being opened or closed, there can be a danger of the door impinging upon a person, animal, or object located within the path of the door. Thus, there is an increased risk of damage or injury to persons, animals, or objects located near the door or to the door itself.

Accordingly, arrangements described herein are directed to window-based object detection and/or identification. A window can have a first side and a second side. An optical grating can be operatively positioned with respect to the first side of the window. A light source can be configured to emit light toward the optical grating. A detector can be operatively positioned to acquire spectroscopic data of the light emitted from the light source after the light has interacted with the optical grating. "Spectroscopic data" can include transmitted wavelength(s) and/or reflected wavelength(s) of the light emitted from the light source after the light has interacted with the optical grating. "Spectroscopic data" can include intensity per wavelength data.

It should be noted that the optical grating can have an associated coefficient of thermal expansion. Thus, local changes in temperature by, on, at, near, or around the optical grating can cause the optical grating to thermally expand or contract. Such thermal expansion or contraction can cause a change in the spectroscopic data of the light after the light has interacted with the optical grating.

Using the optical grating, a temperature on the first side can be determined. More particularly, the acquired spectroscopic data of the light after the light has interacted with the optical grating can be used to determine temperature. Based on the temperature, it can be determined whether an object is located on the first side of the window. In this context, "located on" can mean that the object is located at, on, or near the first side of the window.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-12, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth to provide a thorough understanding of the embodiments described herein. However, it will be understood by those of ordinary skill in the art that the embodiments described herein can be practiced without these specific details.

FIG. 1 is an example of an object detection and/or identification window system 100. Some of the possible elements of the object detection and/or identification window system 100 are shown in FIG. 1 and will now be described. It will be understood that it is not necessary for the object detection and/or identification window system 100 to have all of the elements shown in FIG. 1 or described herein. The object detection and/or identification window system 100 can include one or more processors 110, one or more data stores 120, one or more sensors 130, one or more input interfaces 140, one or more output interface(s) 150, one or more dual-sided transparent displays 160, one or more power source(s) 170, one or more modules 180, and one or more windows 200.

The various elements of the object detection and/or identification window system 100 can be communicatively linked through one or more communication networks 195. As used herein, the term "communicatively linked" can include direct or indirect connections through a communication channel or pathway or another component or system. A "communication network" means one or more components designed to transmit and/or receive information from one source to another. The communication network(s) 195 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network(s) 195 further can be implemented as or include one or more wireless networks, whether short or long range. For example, in terms of short range wireless networks, the communication network(s) 195 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network(s) 195 can include a mobile, cellular, and or satellite-based wireless network and support voice, video, text, and/or any combination thereof. Examples of long range wireless networks can include GSM, TDMA, CDMA, WCDMA networks or the like. The communication network(s) 195 can include wired communication links and/or wireless communication links. The communication network(s) 195 can include any combination of the above networks and/or other types of networks. The communication network(s) 195 can include one or more routers, switches, access points, wireless access points, and/or the like. In one or more arrangements, the communication network(s) 195 can include Vehicle-to-Vehicle (V2V), Vehicle-to-Infrastructure (V2I), Vehicle-to-Cloud (V2C), or Vehicle-to-Everything (V2X) technology.

One or more elements of the object detection and/or identification window system 100 include and/or can execute suitable communication software, which enables two or more of the elements to communicate with each other through the communication network(s) 195 and perform the functions disclosed herein.

As noted above, the object detection and/or identification window system 100 can include one or more processors 110. "Processor" means any component or group of components that are configured to execute any of the processes described herein or any form of instructions to carry out such processes or cause such processes to be performed. As used herein, "cause" or "causing" means to make, force, compel, direct, command, instruct, and/or enable an event or action to occur or at least be in a state where such event or action may occur, either in a direct or indirect manner. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other.

The object detection and/or identification window system 100 can include one or more data stores 120 for storing one or more types of data. The data store(s) 120 can include volatile and/or non-volatile memory. Examples of suitable data stores 120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 120 can be a component of the processor(s) 110, or the data store(s) 120 can be operatively connected to the processor(s) 110 for use thereby. The term "operatively connected," as used throughout this description, can include direct or indirect connections, including connections without direct physical contact.

In some arrangements, the data store(s) 120 can include light source data 122. The light source data 122 can include characteristics of light as it is emitted by light source(s) 240 of the window 200, as will be described below in connection with FIGS. 2A and 2B. As an example, the characteristics can include the wavelength(s) of the emitted light. The characteristics can include intensity data and/or polarization data of the emitted light. The characteristics can include time data, such as wavelength data over time.

In some arrangements, the data store(s) 120 can include wavelength-temperature dependence data 124, particularly with respect to optical grating(s) of the window 200. Wavelength can be directly related the temperature. This relationship is shown in the wavelength-temperature dependence graph 300 of FIG. 3, which shows a sample of wavelength-temperature dependence data 124. The temperature of the optical grating(s) of the window(s) 200 can change. As a result, the optical grating(s) can undergo thermal expansion or thermal contraction of optical grating(s), which, in turn, can cause a change in the spectroscopic data of the light that has interacted with the optical grating(s).

In some arrangements, the data store(s) 120 can include object identification data 126. The object identification data 126 can be any data that can be used to detect and/or identify an object according to arrangements described herein. In some arrangements, the object identification data 126 can include information or data about one or more objects. The object identification data 126 can include information or data about objects that may commonly near a window. Examples of such object can include living things (e.g., human beings, animals) or non-living things (e.g., vehicles, poles, posts, trees, furniture, etc.). For instance, the object identification data 126 can include information or data about a human body or portions thereof (e.g., fingers, hands, arms, chest, shoulders, neck, legs, feet, head, etc.). Further, the object identification data 126 can include information or data about an animal body or portions thereof, various portions of an animal's body (e.g., a head, legs, tail, etc.). The object identification data 126 can include temperature ranges, minimum temperatures, and/or temperature threshold(s) associated with each object. As an example, a human arm can show a temperature within a certain range. In some arrangements, the object identification data 126 can include size, shape, measurements, dimensions, or other information of data about one or more objects. As an example, the object identification data 126 can include an average size or a range of sizes of one or more parts of a human body. For instance, a human arm or human fingers can have an average width. In some arrangements, the object identification data 126 can include temperature patterns for each object as detected at the window(s) 200 described herein. As an example, human fingers can have a temperature pattern of several separate elevated temperature areas. The temperature patterns can be made with respect to the particular array of optical grating(s) of the window(s) 200 as will be described herein.

The object detection and/or identification window system 100 can include one or more sensors 130. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the object detection and/or identification window system 100 includes a plurality of sensors, the sensors can work independently from each other. Alternatively, two or more of the sensors can work in combination with each other. In such case, the two or more sensors can form a sensor network.

The sensor(s) 130 can include any suitable type of sensor. Various examples of different types of sensors will be described herein. However, it will be understood that the embodiments are not limited to the particular sensors described.

When the object detection and/or identification window system 100 is part of a vehicle, the sensor(s) 130 can include one or more vehicle sensors 132. The vehicle sensor(s) 132 can detect, determine, assess, monitor, measure, quantify and/or sense information about a vehicle itself (e.g., position, orientation, speed, etc.). In some arrangements, the vehicle sensor(s) 132 can include one or more door sensors that can detect whether a vehicle door is opened or closed and/or the degree to which a vehicle door is opened. The door sensor(s) can be any type of sensor, now known or later developed.

The sensor(s) 130 can include one or more environment sensors 134 configured to detect, determine, assess, monitor, measure, quantify, acquire, and/or sense driving environment data. "Driving environment data" includes and data or information about the external environment in which a vehicle is located or one or more portions thereof. In one or more arrangements, the environment sensor(s) 134 can include one or more radar sensors, one or more lidar sensors, one or more sonar sensors, and/or one or more cameras.

The object detection and/or identification window system 100 can include one or more input interfaces 140. An "input interface" includes any device, component, system, element or arrangement or groups thereof that enable information/data to be entered into a machine. The input interface(s) 140 can receive an input from a user (e.g., a person) or other entity. Any suitable input interface(s) 140 can be used, including, for example, a keypad, display, touch screen, multi-touch screen, button, dial, joystick, mouse, trackball, microphone, gesture recognition (radar, lidar, camera, or ultrasound-based), stereo dial, and/or combinations thereof.

The object detection and/or identification window system 100 can include one or more output interfaces 150. An "output interface" includes any device, component, system, element or arrangement or groups thereof that enable information/data to be presented to a user (e.g., a person) or other entity. The output interface(s) 150 can present information/data to a user or other entity. The output interface(s) 150 can include a display, an earphone, a haptic device, a projector, and/or speaker. Some components of the object detection and/or identification window system 100 may serve as both a component of the input interface(s) 140 and a component of the output interface(s) 150.

The object detection and/or identification window system 100 can include one or more dual-sided transparent display 160. The dual-sided transparent display(s) 160 can be configured to display first visual information on a first side of the display and to display second visual information on a second side of the display. The first visual information and the second visual information can be displayed simultaneously. In some arrangements, the first visual information is not visible on the second side of the display. Similarly, in some arrangements, the second visual information is not visible on the first side of the display. Various different embodiments of the dual-sided transparent display(s) 160 will be described further below with reference to FIGS. 8-11.

In some arrangements, the dual-sided transparent display(s) 160 can be included in the window 200. In some arrangements, at least a portion of the window 200 can include the dual-sided transparent display(s) 160. In other arrangements, the entire window 200 can be the dual-sided transparent display(s) 160. The dual-sided transparent display(s) 160 can be part of the input interface(s) 140 and/or the output interface(s) 150 of the object detection and/or identification window system 100. The dual-sided transparent display(s) 160 can be configured to display information, data, images, and/or video to a person near the window 200.

The object detection and/or identification window system 100 can include one or more power source(s) 170, as noted above. The power source(s) 170 can be any power source capable of and/or configured to power the object detection and/or identification window system 100 and/or one or more elements thereof. For example, the power source(s) 170 can include one or more alternating current or direct current sources such as one or more batteries, one or more fuel cells, one or more generators, one or more alternators, one or more solar cells, and combinations thereof.

Figure 2A:
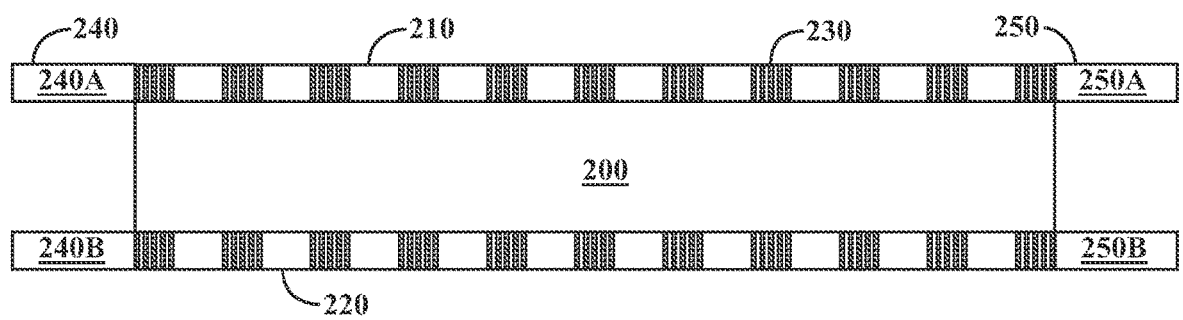
FIG. 2A is a first example of a window.
Figure 2B:
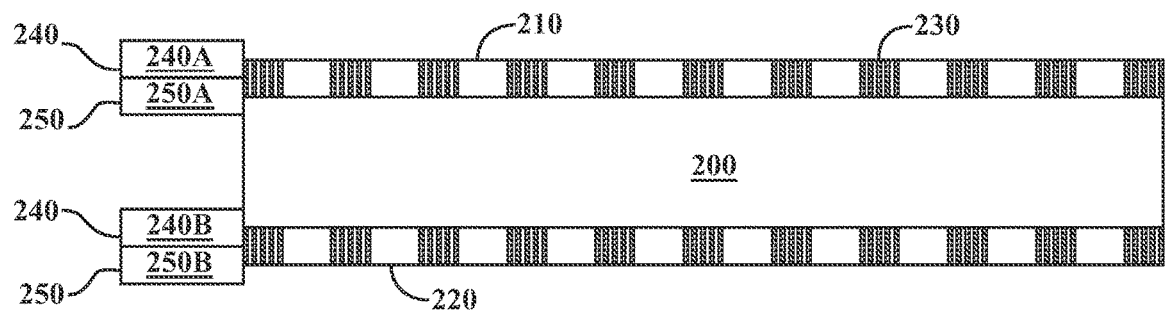
FIG. 2B is a second example of a window.

As noted above, the object detection and/or identification window system 100 can include a window 200. Referring to FIGS. 2A and 2B, some examples of the window 200 are shown. The window 200 can include a first side 210 and a second side 220. The second side 220 can be substantially parallel to the first side 210. The first side 210 and/or the second side 220 can include a surface of the window 200, for example, a surface of a glass pane. Alternatively, the first side 210 and/or the second side 220 can be separate window components, for example, separate glass panes. In such arrangements, the panes can be separated by a noble gas (e.g. argon or krypton) compartment (or layer) with an appropriate edge seal to the panes. The window 200 can be made of any suitable material, now known or later developed. The window 200 can have any suitable size, shape, and/or configuration. The window 200 can include one or more layers.

The window 200 can include one or more optical gratings 230. The optical grating(s) 230 can be operatively positioned with respect to the first side 210 and/or the second side 220. As shown in FIGS. 2A and 2B, the window 200 includes a plurality of optical gratings 230 operatively positioned with respect to both the first side 210 and the second side 220. As used herein, the term "operatively positioned" means on, in, or under the respective surface of the window such that a temperature of the environment on that side of the window can affect the thermal expansion or contraction of the optical grating. As a result, the spectroscopic characteristics of light interacting with the optical grating can be affected.

There can be any suitable quantity of optical gratings 230. In some instances, the quantity of the optical grating(s) 230 on the first side 210 can be the same as the quantity of the optical grating(s) 230 on the second side 220. In other instances, the quantity of the optical grating(s) 230 on the first side 210 can be different than the quantity of the optical grating(s) 230 on the second side 220. In some arrangements, the size, arrangement, and distribution of the optical grating(s) 230 on the first side 210 can be the same as the size, arrangement, and distribution of the optical grating(s) 230 on the second side 220. In some arrangements, the size, arrangement, and/or distribution of the optical grating(s) 230 on the first side 210 can be different from the size, arrangement, and/or distribution of the optical grating(s) 230 on the second side 220. In some arrangements, the optical grating(s) 230 on the first side 210 can be substantially aligned with the optical grating(s) 230 on the second side 220. In some arrangements, the optical grating(s) 230 on the first side 210 may not be aligned with the optical grating(s) 230 on the second side 220 such that they do not overlap in a direction that passes through and is substantially perpendicular to the first side 210 and the second side 220.

The optical grating(s) 230 can be configured to interact with light. The optical grating(s) 230 can have an associated thermal expansion coefficient. Thus, the optical grating(s) 230 can thermally expand or contract based on the temperatures by, on, at, near, or around the optical grating(s) 230. For example, the ambient temperature of the environment can cause thermal expansion or contraction of the optical grating(s) 230. As another example, the presence of a thermal body (e.g., a portion of a human body) near the optical grating(s) 230 can cause thermal expansion or contraction of the optical grating(s) 230. The thermal expansion or contraction of the optical grating(s) 230 can affect the spectroscopic data (e.g., reflected wavelength and/or transmitted wavelength) of the light after the light has interacted with the optical grating(s) 230. In some arrangements, the optical grating(s) 230 can be configured to filter or remove one or more wavelengths of the light. The optical grating(s) 230 can be any suitable type of optical grating with a thermal expansion coefficient.

For example, the optical grating(s) 230 can also be configured as a notch band reject grating or a notch band pass grating. The notch band reject grating (e.g., notch filter) can be configured to reflect or filter a small segment of light (e.g., one wavelength or a subset of wavelengths) while allowing the remaining light to pass through the grating. The notch band pass grating (e.g., notch pass) can be configured to allow a small segment of light (e.g., one wavelength or a subset of wavelengths) to pass through the grating while reflecting or filtering the remaining light.

The optical grating(s) 230 can be any suitable form of optical grating(s). For example, one or more of the optical grating(s) 230 can be an optical fiber grating, an optical splitter, a Bragg grating, a fiber Bragg grating, a diffraction grating, a fiber optic wavelength decoder, a ruled grating, a holographic grating, and/or any other optical component with a periodic structure that can diffract or split light energy into one or more its constituent wavelengths such that at least some of these wavelengths are directed at a different angle. In some arrangements, the optical grating(s) 230 can be applied with a light sensitive characteristic of fiber core layer material so that a refractive index on the grating changes where the wavelength and temperature of the optical grating have excellent linear relationships.

The optical grating(s) 230 can be formed on a surface of the window 200, coated on a surface of the window 200, or otherwise formed or integrated into the window 200, for example, below a surface of the window 200. In some arrangements, the optical grating(s) 230 can be formed in the window 200 by depositing, etching, or cutting gratings onto a surface of the window 200. In other arrangements, the optical grating(s) 230 can be coated on the window 200 by applying grating(s) to a surface of the window 200.

In addition to the optical grating(s) 230, the window 200 can include one or more light sources 240, as noted above. The light source(s) 240 can be operatively positioned with respect to the first side 210 and/or the second side 220. As shown in FIGS. 2A and 2B, the window 200 includes a first light source 240A operatively positioned with respect to the first side 210 and a second light source 240B operatively positioned with respect to the second side 220. In these and other arrangements, the light source(s) 240 can be configured to emit light toward the optical grating(s) 230 such that the light interacts with the optical grating(s) 230. The light source(s) 240 can be configured to emit any suitable type of light. For example, the light source(s) 240 can emit polychromatic, visible light, infrared light, or a set of laser diodes with a full-width half max greater than 5 nanometers. In some arrangements, the light source(s) 240 can be wideband light source transmitters.

In addition to the light source(s) 240, the window 200 can include one or more detectors 250, as noted above. The detector(s) 250 can be operatively positioned to detect one or more properties of the light after the light has interacted with the optical grating(s) 230. For example, the detector(s) 250 can be configured to detect one or more wavelengths of the light after the light has interacted with the optical grating(s) 230. The detector(s) 250 can be any suitable type of detector(s). For example, the detector(s) 250 can be spectrometer(s) or detector(s) having multiple spectral filters. In some arrangements, the detector(s) 250 can operate in the infrared section of the electromagnetic spectrum.

In the arrangements shown in FIG. 2A, the detector(s) 250 can be positioned on the opposite side of the optical grating(s) 230 from the light source(s) 240. In these arrangements, the detector(s) 250 can be operatively positioned and configured to detect spectroscopic data (e.g., transmitted wavelength(s)) of the light after the light has passed through the optical gratings. Also shown, the detector(s) 250 can include a first detector 250A operatively positioned with respect to the first side 210 on the opposite side of the optical grating(s) 230 from the first light source 240A. The first detector 250A can detect the spectroscopic data (e.g., transmitted wavelength(s)) of the light emitted by the first light source 240A after it has passed through the optical grating(s) 230 on the first side 210 of the window 200. Similarly, the detector(s) 250 can also include a second detector 250B operatively positioned with respect to the second side 220 on the opposite side of the optical grating(s) from the second light source 240B. The second detector 250B can detect the spectroscopic data (e.g., transmitted wavelength(s)) of the light emitted by the second light source 240B after it has passed through the optical grating(s) 230 on the second side 220. In some arrangements, the first detector 250A can be substantially aligned with the first light source 240A and/or the second detector 250B can be substantially aligned with the second light source 240B.

In the arrangements) shown in FIG. 2B, the detector(s) 250 can be positioned on the same side of the optical grating(s) 230 as the light source(s) 240. In these arrangements, the detector(s) 250 can be operatively positioned and configured to detect the spectroscopic data (e.g., reflected wavelength(s)) of the light after the light has been reflected by the optical grating(s) 230. In these arrangements, the detector(s) 20 can include a first detector 250A operatively positioned with respect to the first side 210 on the same side of the optical grating(s) 230 as the first light source 240A. The first detector 250A can detect the spectroscopic data (e.g., reflected wavelength(s)) of the light emitted by the first light source 240A after it has been reflected by the optical grating(s) 230 on the first side 210 of the window 200. Similarly, the detector(s) 250 can also include a second detector 250B operatively positioned with respect to the second side 220 on the same side of the optical grating(s) as the second light source 240B. The second detector 250B can detect the spectroscopic data (e.g., reflected wavelength(s)) of the light emitted by the second light source 240B after it has been reflected by the optical grating(s) 230 on the second side 220. In some arrangements, the first detector 250A can be substantially adjacent to the first light source 240A and/or the second detector 250B can be substantially adjacent to the second light source 240B.

There can be various arrangements of the optical grating(s) 230, the light source(s) 240 and the detector(s) 250. Some of these arrangements are shown in connection with FIGS. 12A-12D. It should be noted that, in these examples, the terms "input signal" and "output signal" are used for convenience to facilitate the discussion and are used relative to the signal before and after interacting with the optical grating(s) 230, respectively.

Figure 12A:
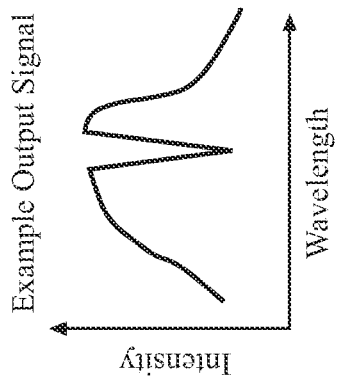
FIG. 12A is an example of an arrangement of a notch band reject grating, a light source, and a detector.
Figure 12A:
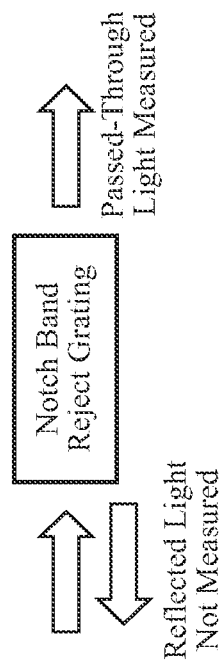
Figure 12A:
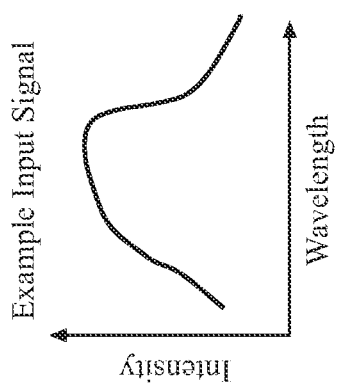

As shown in FIG. 12A, the optical grating(s) 230 can be notch band reject grating(s). The light source(s) 240 can emit an example input signal (e.g., emit light toward the notch band reject grating(s)). The notch band reject grating(s) can be configured to reflect one or a small subset of wavelengths of light and allow the remaining wavelengths to pass through the grating(s). In this example, the detector(s) 250 can be positioned on the opposite side of the grating(s) from the light source(s) 240. The detector(s) 250 can be configured to capture an output signal (light that has passed through the grating(s)). As shown in FIG. 12A, the example output signal can generally have the same shape as the example input signal, but a segment of the signal is missing, which is evident by the v-shaped dip in the example output signal. In these arrangements, the reflected light may not be measured.

Figure 12B:
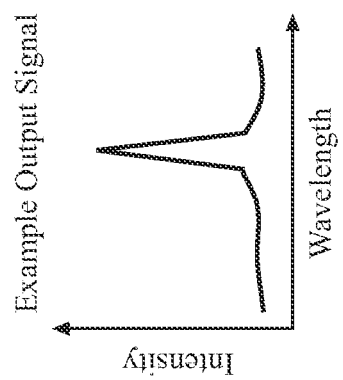
FIG. 12B is an example of an arrangement of a notch band pass grating, a light source, and a detector.
Figure 12B:
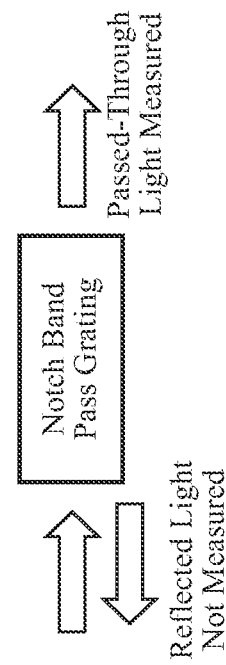
Figure 12B:
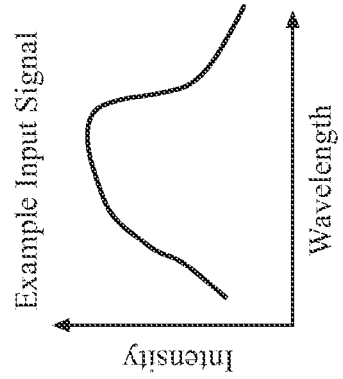

Referring to FIG. 12B, the optical grating(s) 230 can be notch band pass grating(s). The light source(s) 240 can emit an example input signal (e.g., emit light toward the notch band pass grating(s)). The notch band pass grating(s) can be configured to allow only one or a small subset of wavelengths of light to pass through the grating(s) and reflect the remaining wavelengths. The detector(s) 250 can be positioned on the opposite side of the grating(s) from the light source(s) 240. The detector(s) 250 can be configured to capture an output signal (light that has passed-through the grating(s)). As shown in FIG. 12B, only the small segment of light that was allowed to pass appears in the example output signal, which is evident by the spike in the example output signal. In these arrangements, the reflected light may not be measured.

Figure 12C:
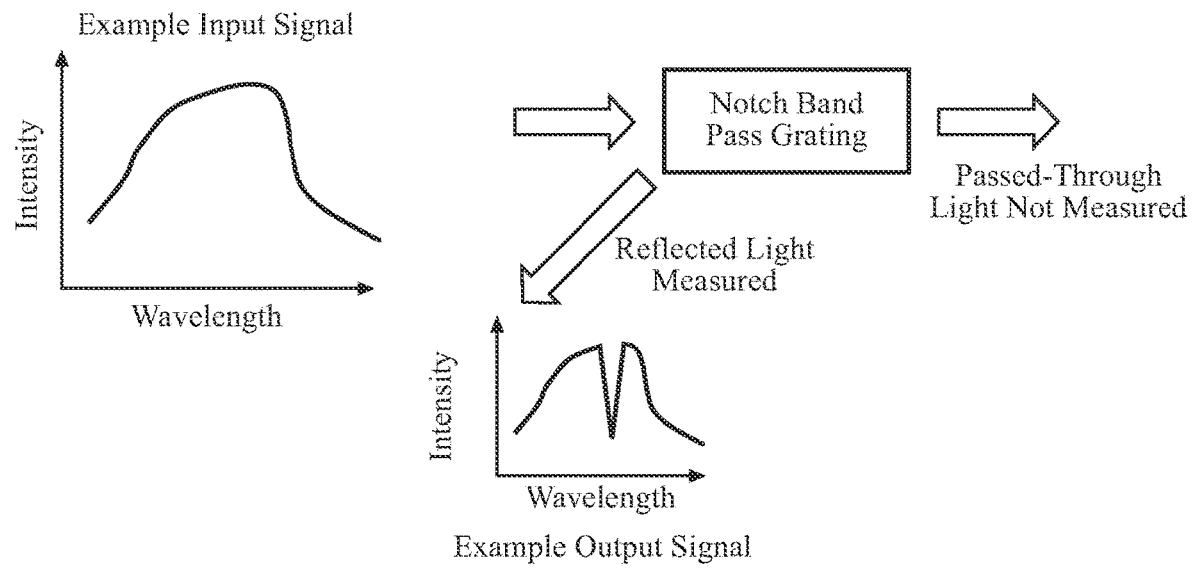
FIG. 12C is an example of an arrangement of a notch band reject grating, a light source, and a detector.

As shown in FIG. 12C, the optical grating(s) 230 can be notch band pass grating(s). The light source(s) 240 can emit an example input signal (e.g., emit light toward the notch band pass grating(s)). The notch band pass grating(s) can be configured to allow one or a small subset of wavelengths of light to pass through the grating(s) while reflecting the remaining wavelengths of the input signal. The detector(s) 250 can be positioned on the same side of the grating(s) as the light source(s) 240. The detector(s) 250 can be configured to capture an output signal (light reflected by the grating(s)). As shown in FIG. 12C, the example output signal can generally have the same shape as the example input signal, but a small segment of the signal is missing, which is evident by the v-shaped dip in the example output signal. In these arrangements, the passed-through light may not be measured.

Figure 12D:
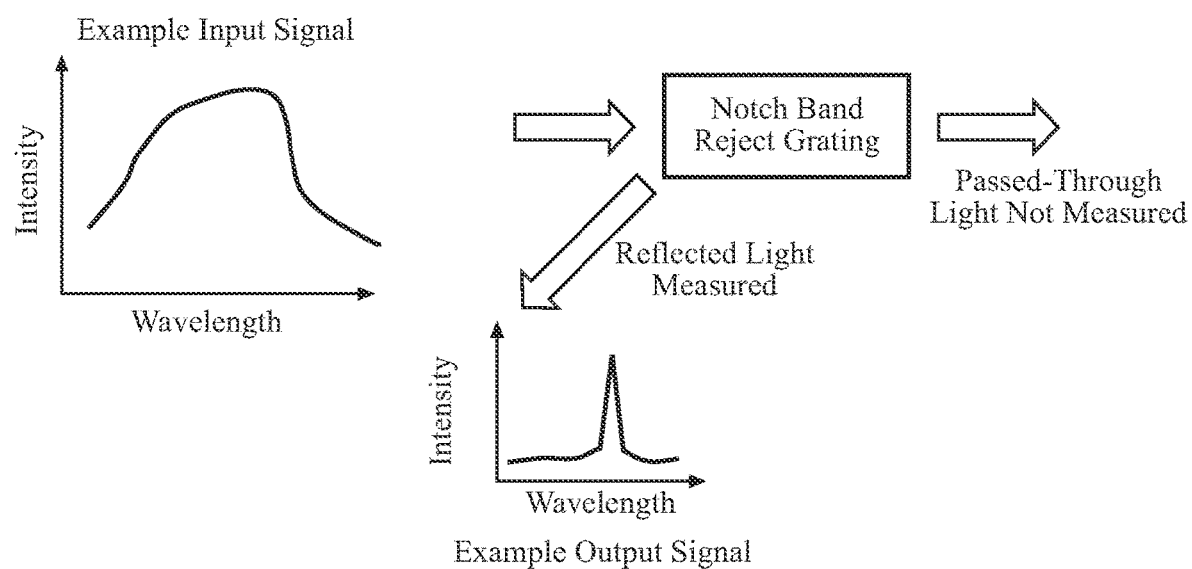
FIG. 12D is an example of an arrangement of a notch band pass grating, a light source, and a detector.

Referring to FIG. 12D, the optical grating(s) 230 can be notch band reject grating(s). The light source(s) 240 can emit an example input signal (e.g., emit light toward the notch band reject grating(s)). The notch band reject grating(s) can be configured to reflect one or a small subset of wavelengths of light and allow the remaining wavelengths to pass through the grating(s). The detector(s) 250 can be positioned on the same side of the grating(s) as the light source(s) 240. The detector(s) 250 can be configured to capture an output signal (light reflected by the grating(s)). As shown in FIG. 12D, only the small segment of light that was reflected appears in the example output signal, which is evident by the spike in the example output signal. In these arrangements, the passed-through light may not be measured.

The optical grating(s) 230 can be used to determine a temperature on the first side 210 and/or the second side 220 through detection of the spectroscopic data (e.g., transmitted and/or reflected wavelength(s)) of light after it has interacted with the optical grating(s) 230. As used in this respect, the term "near" can mean being within a distance from the surface of the window, such as about 12 inches or less, about 11 inches or less, about 10 inches or less, about 9 inches or less, about 8 inches or less, about 7 inches or less, about 6 inches or less, about 5 inches or less, about 4 inches or less, about 3 inches or less, about 2 inches or less, about 1 inch or less, about 0.75 inches or less, about 0.5 inches or less, or about 0.25 or less. In order to determine the temperature, the object detection and/or identification window system 100 can compare information about the light emitted by the light source(s) 240 and/or the spectroscopic data detected by the detector(s) 250 to the wavelength-temperature dependence data 124, as will be discussed further below with reference to FIG. 3.

The object detection and/or identification window system 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, the data store(s) 120 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The object detection and/or identification window system 100 can include one or more temperature determination modules 182. The temperature determination module(s) 182 can be configured to determine the temperature on, at, or near the first side 210 and/or the second side 220 of the window 200. The temperature determination module(s) 182 can be configured to determine the temperature in any suitable manner.

For example, by using the light source data 122 and/or by detecting the spectroscopic data of the light after it has interacted with the optical grating(s) 230, the temperature determination module(s) 182 can be configured to determine a change in the characteristics of the light by comparing the original light signal from the light source(s) 240 to the acquired spectroscopic data of the light after it has interacted with the optical grating(s) 230. The change in the wavelength(s) from the original light signal to the acquired spectroscopic data may correspond to the temperature on, at, or near the optical grating(s) 230. As the temperature changes, the transmissive wavelength spectra changes. In some arrangements, an increase in the wavelength(s) may correspond to an increase in the temperature on, at, or near the surface of the window 200 (e.g., at or near the optical grating(s) 230). Similarly, a decrease in the wavelength(s) may correspond to a decrease in the temperature on, at, or near the surface of the window 200 (e.g., at or near the optical grating(s) 230). The light source data 122 can also be used to calibrate one or more components of the object detection and/or identification window system 100, for example, the detector(s) 250.

In some arrangements, the temperature determination module(s) 182 can be configured to analyze data and/or information acquired by the detector(s) 250. For example, the temperature determination module(s) 182 can receive the spectroscopic data (e.g., transmitted or reflected wavelength(s)) of the light after it has interacted with the optical grating(s) 230. The temperature determination module(s) 182 can compare the detected spectroscopic data to the wavelength-temperature dependence data 124 and/or the light source data 122. In some arrangements, the detector(s) 250 can detect a specific wavelength of light or a set of wavelengths of light after it has passed through the optical grating(s). In other arrangements, the detector(s) 250 can detect a specific wavelength of light or a set of wavelengths of light reflected by the optical grating(s). In some arrangements, the specific wavelength of light or the set of wavelengths of light can correlate to a peak in the transmissive spectra of the light. In some arrangements, the temperature determination module(s) 182 can be configured to determine a plurality of temperatures based on the spectroscopic data received from each of a plurality of detectors. In such case, the plurality of detectors can be arranged in any suitable manner on the window 200, such an in one or more rows, one or more columns, or in any other arrangement.

Figures 3, 4:
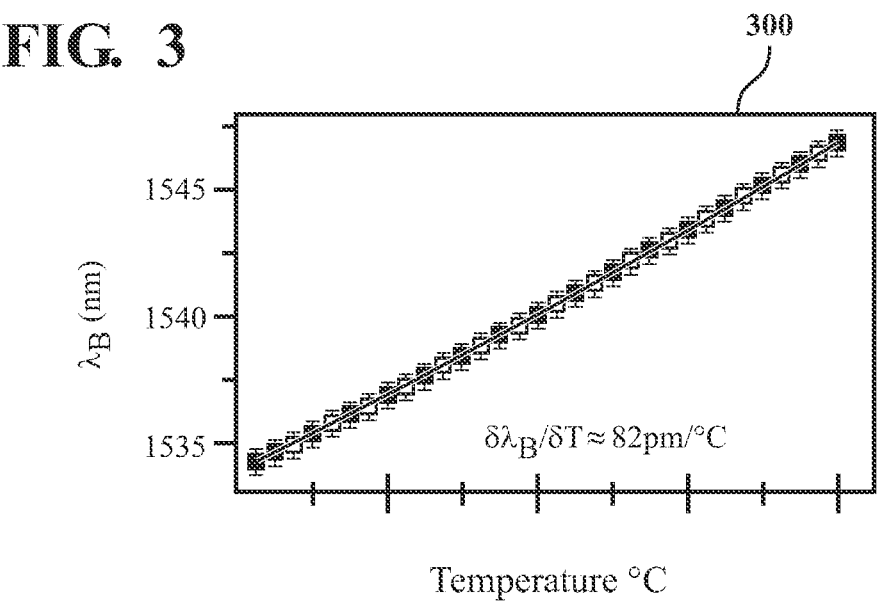
FIG. 3 is an example of a Bragg wavelength-temperature graph.
FIG. 4 is an example of a window-based object detection and/or identification method.

With reference now to FIG. 3, a detected peak can be directly related the temperature on, at, or near the optical grating(s) 230. This relationship is shown in the wavelength-temperature dependence graph 300 of FIG. 3, which shows a sample of wavelength-temperature dependence data 124. As indicated in the wavelength-temperature dependence data 124, the transmitted/reflected wavelength(s) can change based on the thermal expansion or thermal contraction of the optical grating(s) 230. The optical grating(s) 230 can expand or contract due to changes in temperature. Through detection of the peak, the temperature on, at, or near the optical grating(s) 230 may be determined using this graph by comparing the wavelength(s) at the peak to the wavelength-temperature dependence data 124.

In some arrangements, the temperature determination module(s) 182 can be configured to analyze changes in one or more characteristics of the light after it has interacted with the optical grating(s) 230 in order to determine the temperature. In some arrangements, the object detection and/or identification window system 100 can include light source data 122, which includes characteristics of the light as it is emitted by the light source(s) 240, such as the wavelength(s) of the emitted light. Using the light source data 122, and by detecting the spectroscopic data (e.g., wavelength(s)) of the light after it has interacted with the optical grating(s) 230, the temperature determination module(s) 182 can be configured to determine a change in the wavelength of the light. The change in the wavelength(s) may correspond to the temperature on, at, or near the optical grating(s) 230. As the temperature changes, the transmissive wavelength spectra changes. In some arrangements, an increase in the wavelength(s) may correspond to an increase in the temperature on, at, or near the surface of the window 200. Similarly, a decrease in the wavelength(s) may correspond to a decrease in the temperature on, at, or near the surface of the window 200. The light source data 122 can also be used to calibrate one or more components of the object detection and/or identification window system 100, for example, the detector(s) 250.

In some arrangements, the light source data 122 can be determined in real-time. Thus, in addition to emitting light at the optical grating(s) 230, the light source(s) 240 can emit light directly at the detector(s) 250. In this case, the detector(s) 250 can determine the optical characteristics of the light without interacting with the optical grating(s) 230. In this way, the light can serve as a reference signal. The temperature determination module(s) 182 can be configured to analyze the differences between the reference signal and the characteristics of the light after it has interacted with the optical grating(s) 230. For example, the temperature determination module(s) 182 can be configured to identify changes in wavelength(s) between the reference signal and the characteristics of the light (e.g., spectroscopic data) after it has interacted with the optical grating(s) 230. As another example, the temperature determination module(s) 182 can be configured to identify the absence of one or more wavelengths in the light after it has interacted with the optical grating(s) 230 relative to the reference signal.

Moreover, in some arrangements, when the broadband light from the light source(s) 240 is emitted toward the optical grating(s) 230, the optical grating(s) 230 may carry out selective reflection of the light and then reflect a central wavelength and core refractive rate phase modulation that matches a narrow band of light. Therefore, the wavelength-temperature dependence data 124 can be used to determine the corresponding temperature.

The object detection and/or identification window system 100 can include one or more object detection modules 184. The object detection module(s) 184 can be configured to determine whether an object is located on one or both sides of a window. The object detection module(s) 184 can be configured to do so in any suitable manner.

For instance, the object detection module(s) 184 can be configured to compare the temperature(s), as determined by the temperature determination module(s) 182, to the object identification data 126, which can include temperature ranges, temperature differential thresholds, or thresholds for objects (such as parts of a human body). If the determined temperature(s) fall within a range or meet a threshold, then it can be determined that an object is detected.

In some arrangements, the object detection module(s) 184 can be configured to compare the temperature(s), as determined by the temperature determination module(s) 182, to an ambient temperature or an expected temperature. When the determined temperature(s) differ from the ambient temperature or the expected temperature, above or below a threshold, then an object can be determined to be located on a side of the window.

The object detection and/or identification window system 100 can include one or more object identification modules 186. The object identification module(s) 186 can be configured to identify an object that is located on a side of a window. The object identification module(s) 186 can be configured to identify the exact object, general nature of the object (e.g., portion of a human body), class of the object (e.g., living v. non-living). The object identification module(s) 186 can be configured to do so in any suitable manner.

The object identification module(s) 186 can analyze temperatures determined by the temperature determination module(s) 182 to detect, identify, and/or classify an object. The object identification module(s) 186 can use any suitable technique, including, for example, template matching and other kinds of computer vision and/or image processing techniques and/or other artificial or computational intelligence algorithms or machine learning methods. The object identification module(s) 186 can include any suitable object recognition software. The object identification module(s) 186 can query the object identification data 126 for possible matches. For instance, the object identification module(s) 186 can be configured to compare a distribution of temperatures, as determined by the temperature determination module(s) 182, to object identification data 126, such as temperature patterns.

The object identification module(s) 186 can identify a detected object if there is a match between the determined temperature profile of the detected object and the object identification data 126. "Match" or "matches" means that the determined temperature profile of the detected object and an entry in the object identification data 126 are substantially identical. For instance, the determined temperature profile of the detected object and an entry in the object identification data 126 can match within a predetermined probability (e.g., at least about 85%, at least about 90%, at least about 95% or greater) or confidence level.

In some arrangements, the object detection module(s) 184 can be configured to determine a size of an object based on a plurality of temperatures. The determined sized can be compared to sizes included in the object identification data 126 to determine whether an object is located on a side of the window. For instance, a plurality of the optical gratings 230 that are sequentially arranged in a row may indicate substantially the same elevated temperature. The distance across these optical gratings 230 can be assumed to the width of an object. This width can be compared to the object identification data 126.

In some arrangements, the object identification module(s) 186 can be configured to generate a thermal map using the plurality of temperatures from a plurality of detectors 250. The thermal map and/or the plurality of temperatures can be compared to one or more temperature patterns or profiles included in the object identification data 126. The object identification module(s) 186 can be configured to identify a detected object if there is a match between the thermal map and/or the plurality of temperatures and the one or more temperature patterns or profiles included in the object identification data 126.

Figure 7:
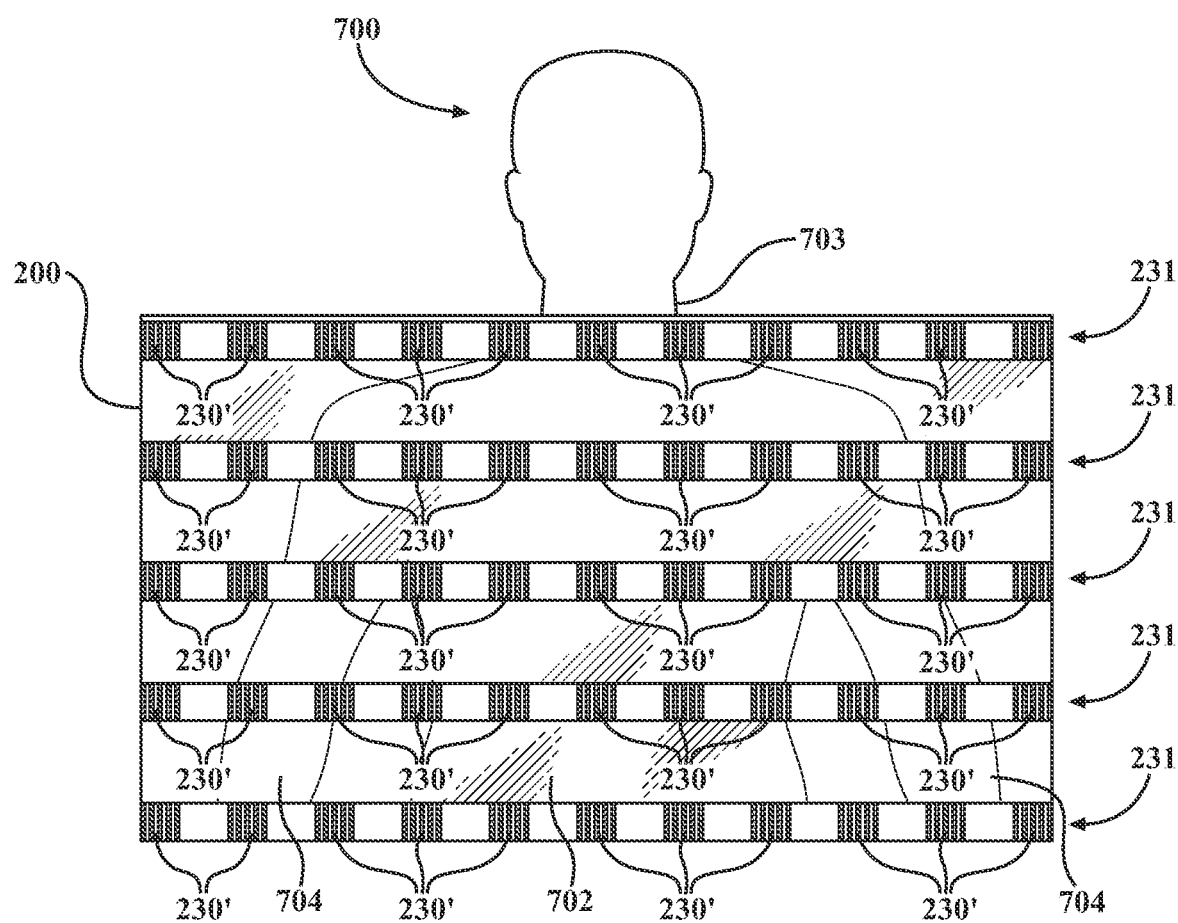
FIG. 7 is an example of a window configured for object detection and/or object identification, showing a plurality of optical gratings.

Referring to FIG. 7, an example of the window 200 including a plurality of the optical gratings 230 is shown. The optical gratings 230 can be arranged in a plurality of rows. In this particular example, there can be five rows 231. There can be any suitable quantity of optical gratings 230 in each row, and the optical gratings 230 can be distributed in each row in any suitable manner. In one or more arrangements, the quantity and arrangement of the optical gratings 230 in the plurality of rows can be substantially identical, as is shown in FIG. 7. However, in some arrangements, the quantity and/or distribution of the optical gratings 230 in at least one of the rows can differ from the other rows.

In FIG. 7, a person 700 can be standing near the window 200. More particularly, at least a portion of a torso 702, a neck 703, and/or the arms 704 of the person 700 can be near the window 200. The optical gratings 230' near these body portions of the person 700 can be affected by the body heat of the person 700. As a result, the wavelength of the light from the light sources 240 impinging upon the affected optical gratings 230' can be affected, which can be detected as described above. The temperature determined at each of the optical gratings 230' can be used to generate a thermal map and/or a temperature pattern. It will be appreciated that the thermal map and/or the temperature pattern may exhibit a distinctive pattern. The thermal map and/or the temperature pattern can be used by the object identification module(s) 186 to identify the object on, at, or near the window 200.

The object detection and/or identification window system 100 can include one or more door status modules 188. The door status module(s) 188 can be configured to determine whether a door (e.g., a vehicle door, a building door, etc.) is opened or closed. In in some arrangements, the door status module(s) 188 can be configured to determine the extent to which the door is opened. In some arrangements, the door status module(s) 188 can be configured to determine whether a door is in the process of being opened or closed. The door status module(s) 188 can be configured to do so in any suitable manner. For instance, the door status module(s) 188 can make sure determinations by using on data acquired by the sensor(s) 130, such as the door sensor(s), proximity sensors, door handle sensors, accelerometers, or other sensors. As an example, the door status module(s) 188 can determine whether a door is opened or closed and/or the degree to which the door is opened based on data acquired by the door sensor(s), proximity sensors, or other sensors. In some arrangements, the door status module(s) 188 can determine that a door is being opened or closed based on user engagement with a handle of the door.

The object detection and/or identification window system 100 can include one or more control modules 190. The control module(s) 190 can be configured to take one or more actions in response to determining that an object is located on one or both sides of the window 200.

For instance, the control module(s) 190 can be configured to cause a message, a warning, an alert, a notification, or a greeting to be presented. In some instances, the control module(s) 190 can be configured to cause a message, a warning, an alert, a notification, or a greeting to be presented on a display (e.g., the dual-sided transparent display(s) 160, the output interface(s) 150, and/or the window(s) 200). As an example, the control module(s) 190 can cause a message, a warning, an alert, a notification, or a greeting to be presented on a side of the window 200 upon which an object is detected and/or on a side of the window 200 which can be seen by a person. In one example, the warning or alert can apprise a vehicle occupant of a danger posed by the opening a door of the vehicle. Alternatively or additionally, the control module(s) 190 can cause a warning or alert to be presented to a driver of the vehicle. The control module(s) 190 can be configured to send control signals (e.g., commands) to the display. Alternatively or additionally, the control module(s) 190 can be configured to cause a message, a warning, or a greeting to be presented in other forms, such as audially, haptically, or olfactory.

In some arrangements, the control module(s) 190 can be configured to cause some action to be taken with respect to the structure of which the window is a part. For instance, when the window is a part of a door of a vehicle and the window detects a person on one side of the window, the control module(s) 190 can be configured to cause the door of the vehicle to be unlocked. As another example, if an object is detected on one side of the window and the object is determined to be located in an opening path or a closing path of the door, then a movement of the door can be controlled (e.g., prevented or reversed) and/or a warning can be presented on the window. The control module(s) 190 can be configured to send control signals (e.g., commands) to the window or other display and/or to one or more vehicle components.

Now that the various potential systems, devices, elements and/or components of the object detection and/or identification window system 100 have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Turning to FIG. 4, an example of a method 400 for window-based object detection and/or identification is shown. A window can have a first side and a second side. An optical grating can be operatively positioned with respect to the first side of the window. A light source can be configured to emit light toward the optical grating. A detector can be operatively positioned to acquire spectroscopic data of the light emitted from the light source after the light has interacted with the optical grating.

At block 410, the method 400 can include determining, using the optical grating, a temperature on, at, or near the first side of the window. The temperature can be determined by the temperature determination module(s) 182 and/or the processor(s) 110. For instance, the temperature determination module(s) 182 and/or the processor(s) 110 can compare the spectroscopic data obtained by the detector to the wavelength-temperature dependence data 124. The method 400 can continue to block 420.

At block 420, the method 400 can include determining, based on the temperature, whether an object is located on the first side of the window. Such a determination can be made by object detection module(s) 184 and/or the processor(s) 110. For instance, the object detection module(s) 184 and/or the processor(s) 110 can compare the determined temperature to object identification data 126 to determine whether an object is location in the opening. Alternatively or additionally, the object detection module(s) 184 and/or the processor(s) 110 can compare the determined temperature to one or more temperature thresholds.

After block 420, the method 400 can end. Alternatively, the method 400 can return to block 410, or the method 400 can proceed to some other block. The method 400 can be performed continuously, periodically, irregularly, randomly, or responsive to a condition, event, or input. For instance, the method 400 can be initiated when a window close command is received.

The method 400 can include additional and/or alternative steps to those describe above. As an example, the method can include identifying the object on the first side of the window. Such identifying can be performed by the object identification module(s) 186 and/or the processor(s) 110. For instance, the object identification module(s) 186 and/or the processor(s) 110 can compare the detected temperature or a temperature pattern to object identification data 126. If there is a match between the detected temperature or a temperature pattern to the object identification data 126, then the object can be identified.

As another example, the method 400 can include, responsive to determining that an object is located on the first side of the window, causing one or more actions to be taken. Such causing can be performed by the control module(s) 190 and/or the processor(s) 110. Examples of such actions can include controlling the window, controlling the structure that the window is a part of (e.g., a door), and/or presenting a message, greeting, or warning.

Figure 5A:
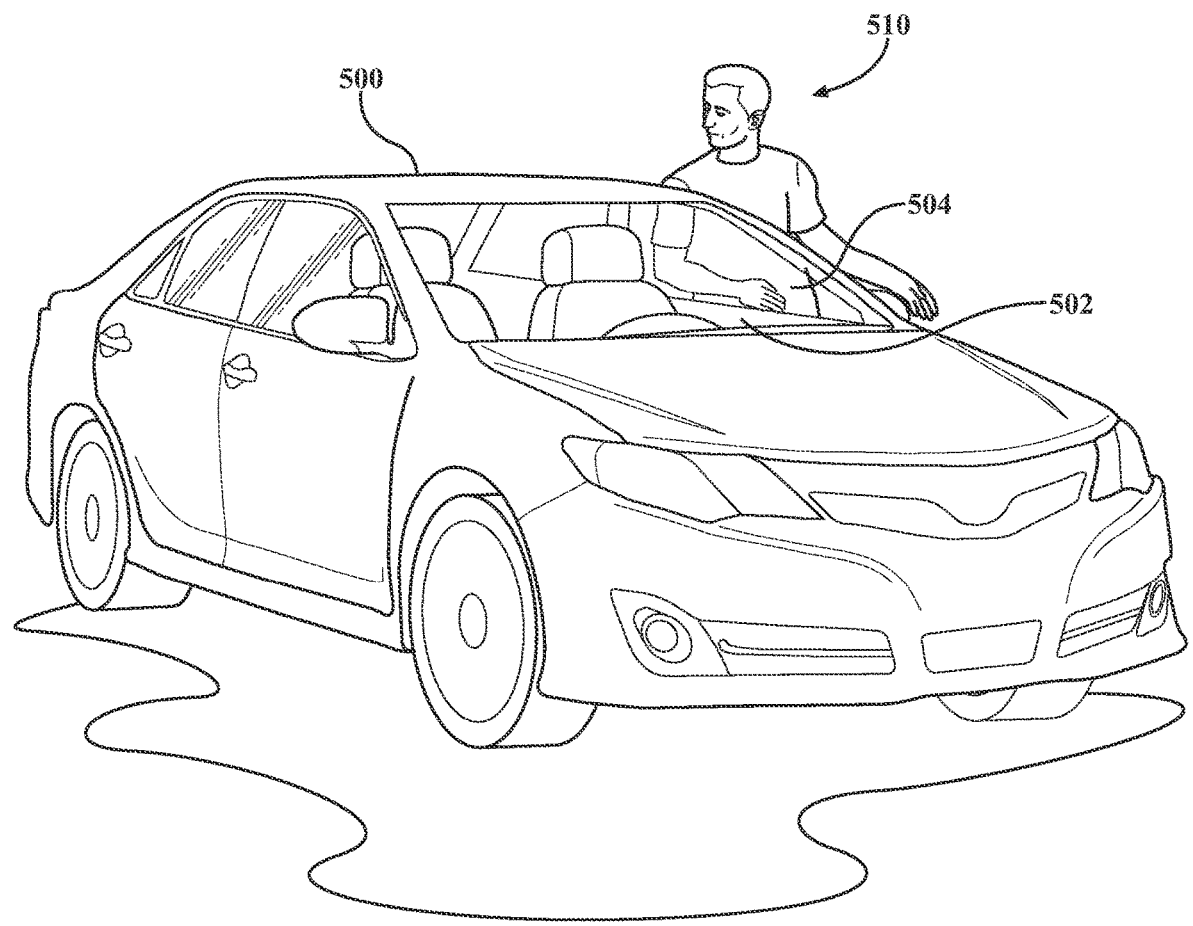
FIG. 5A is an example of a vehicle including the window-based object detection and/or object identification system, showing a person standing next to the vehicle.
Figure 5B:
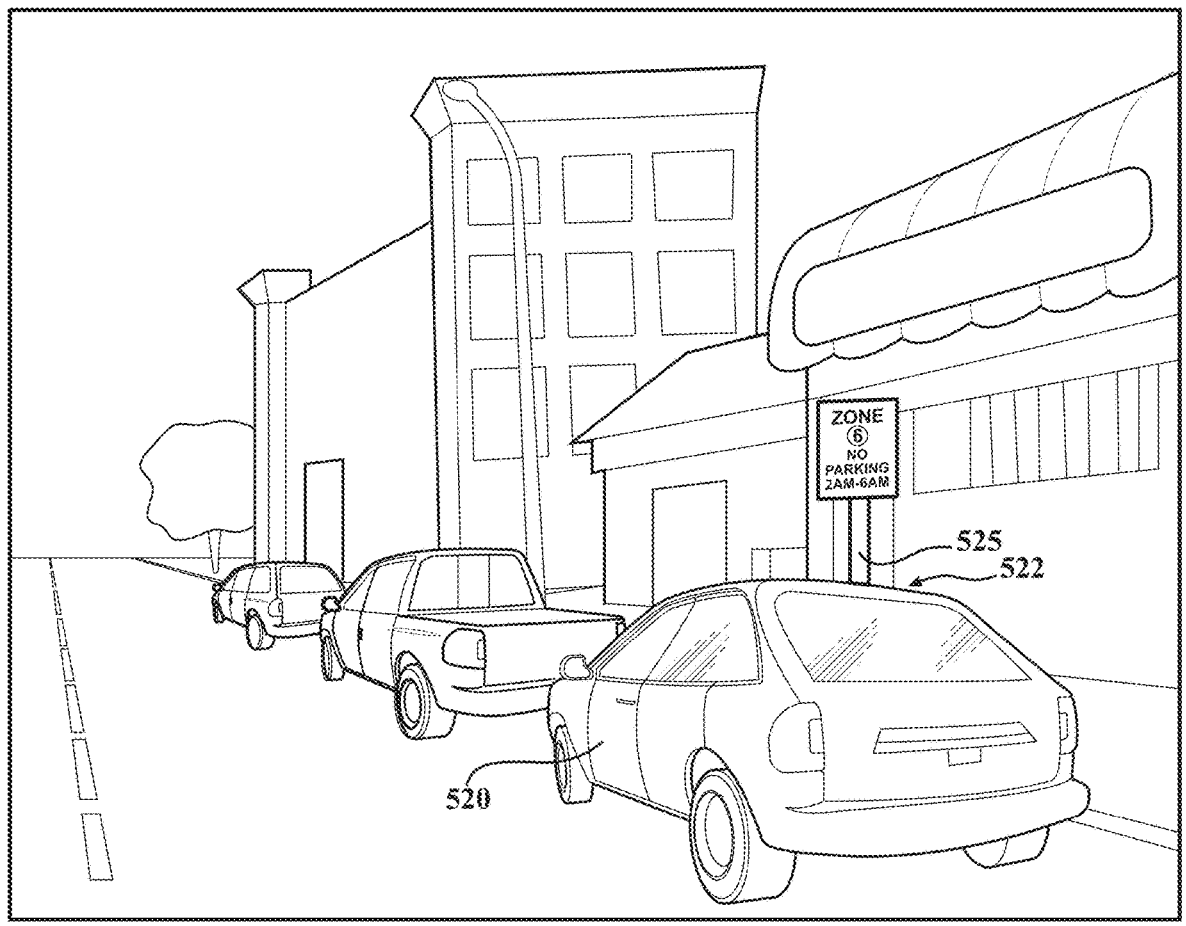
FIG. 5B is an example of a vehicle including the window-based object detection and/or object identification system, showing the vehicle parked on a street next to a sign post.
Figure 5C:
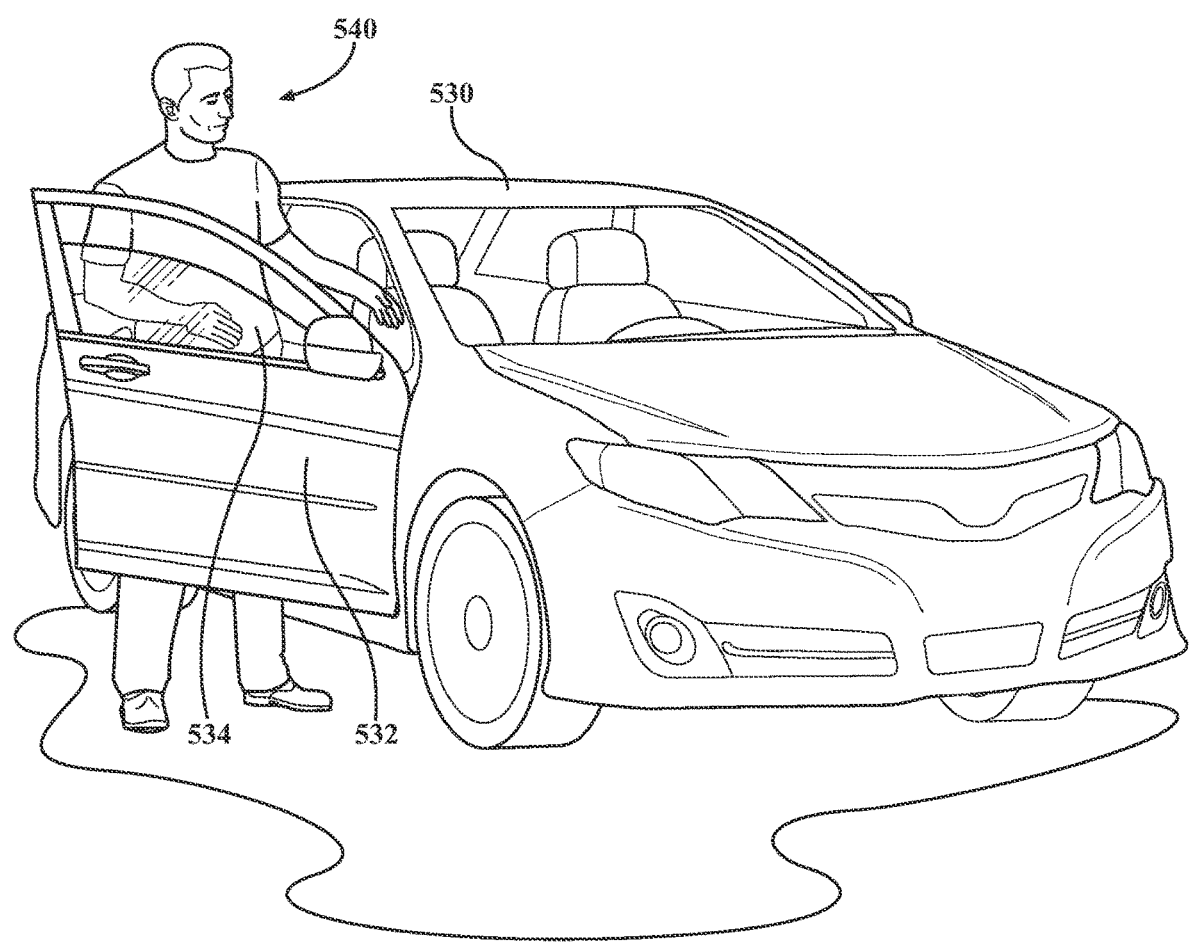
FIG. 5C is an example of a vehicle including the window-based object detection and/or object identification system, showing a person standing in an open door of the vehicle.

Non-limiting examples of the operation of the arrangements described herein will now be presented. FIGS. 5A-5C show various examples of scenarios in which a vehicle includes the object detection and/or identification window system 100.

Referring to FIG. 5A, an example of a vehicle 500 including the window-based object detection and/or object identification window system 100 is shown. In this example, the vehicle 500 can include a door 502 with a window 504. Here, a person 510 can be standing next to the vehicle 500 and, more particularly, the window 504.

The object detection and/or identification window system 100 can acquire spectroscopic data. Using the acquired spectroscopic data, a temperature can be determined. The temperature can be determined by the temperature determination module(s) 182 and/or the processor(s) 110. For instance, the temperature determination module(s) 182 and/or the processor(s) 110 can compare the spectroscopic data to the wavelength-temperature dependence data 124. It will be appreciated that the presence of the person 510 can affect the acquired spectroscopic data at the optical gratings 230 on, at, or near the person 510 due to the heat energy of the person 510.

Based on the temperature(s), it can be determined whether an object is located on that side of the window 200. Such a determination can be made by object detection module(s) 184 and/or the processor(s) 110. For instance, object detection module(s) 184 and/or the processor(s) 110 can use the determined temperature(s) to determine whether an object is located on one side of the window. Such a determination can be made in any suitable manner. As an example, the determined temperature(s) can be compared to one or more object temperature profiles, which can be a temperature range for particular objects. If the temperature(s) falls within the range, then it can be determined to be an object of concern. As another example, the temperature(s) can be compared to an ambient temperature or an expected temperature. When the temperature differs from the ambient temperature or the expected temperature, then an object can be determined to be located on the respective side of the window 200.

In some arrangements, the object detection and/or identification window system 100 can further identify the object. Such identification can be performed by the object identification module(s) 186 and/or the processor(s) 110. The identification can performed be based on the temperatures determined by the temperature determination module(s) 182 and/or the processor(s) 110. As an example, if the determined temperature is within a known range of a human being, then the object can be identified as a person. Alternatively or additionally, the identification can be performed based on a temperature distribution and/or a thermal map generated using the determined temperatures. If the temperatures, temperature distribution and/or thermal map match an entry in the object identification data 126, then the object can be identified.

In response to determining that an object is located at one near the window, an action can be taken as appropriate. Using the sensor(s) 130, the door status module(s) 188, and/or the processor(s) 110, it can be determined whether the door 502 is opened or closed. Here, the door status module(s) 188, and/or the processor(s) 110 can determine that the door 502 is closed. The control module(s) 190 and/or the processor(s) 110 can determine the opening path of the door 502, such as by using known characteristics of the door 502 (e.g., dimensions, pivot radius, range of motion, etc.), which can be stored in the data store(s) 120. Based on the door closing path and the location of the person 510, the control module(s) 190 and/or the processor(s) 110 can take one or more actions. For instance, the control module(s) 190 and/or the processor(s) 110 can cause a warning or greeting to be presented on the window 200, such as on a dual-sided transparent display 160 integrated into the window 200. The greeting can welcome a car owner back to the car, or the warning can indicate to the person 510 that the door 502 may be opened from an occupant inside the vehicle 500. Alternatively or addition, the control module(s) 190 and/or the processor(s) 110 can cause a movement of door 502 to be controlled. For instance, the control module(s) 190 and/or the processor(s) 110 send signals to one or more elements of the vehicle 500 to prevent the door 502 from being opened from the inside.

Referring to FIG. 5B, an example of a vehicle 520 including the window-based object detection and/or object identification window system 100 is shown. In this example, the vehicle 520 can be parked on a street next to a sign post 525. The sign post 525 can be near a window (not visible in the view shown) of the vehicle 520.

The object detection and/or identification window system 100 can acquire spectroscopic data. Using the acquired spectroscopic data, a temperature can be determined as described above. It will be appreciated that the presence of the sign post 525 can affect the acquired spectroscopic data at the optical gratings 230 of the window.

Based on the temperature(s), it can be determined whether an object is located on that side of the window. Such a determination can be made by object detection module(s) 184 and/or the processor(s) 110. In this instance, the sign post 525 may have a lower temperature that the surrounding environment, which would indicate the presence of an object.

In some arrangements, the object detection and/or identification window system 100 can further identify the object. The object identification module(s) 186 and/or the processor(s) 110 can identify the object as a sign post by, for example, comparing the temperature of the object and/or one or more dimensions of the object (as revealed by temperature distribution) to the object identification data 126. Based on the temperature, the object identification module(s) 186 and/or the processor(s) 110 can recognize that the object is a non-living object.

In response to determining that an object is located at one near the window, an action can be taken as appropriate. Using the sensor(s) 130, the door status module(s) 188, and/or the processor(s) 110, it can be determined whether the door 522 is opened or closed. Here, the door status module(s) 188, and/or the processor(s) 110 can determine that the door 522 is closed. The control module(s) 190 and/or the processor(s) 110 can determine the opening path of the door 522. Based on the door opening path and the location of the sign post 525, the control module(s) 190 and/or the processor(s) 110 can take one or more actions. Here, since a non-living object is located outside the door 522, the control module(s) 190 and/or the processor(s) 110 can cause a movement of door 522 to be controlled. For instance, the control module(s) 190 and/or the processor(s) 110 send signals to one or more elements of the vehicle 500 to prevent the door 522 from being opened from the inside. Thus, contact between the door 522 and the sign post 525 can be avoided, which, in turn, avoids damage to the vehicle 520 and/or the sign post 525.

Referring to FIG. 5C, an example of a vehicle 530 including the window-based object detection and/or object identification window system 100 is shown. In this example, the vehicle 530 can include a door 532 with a window 534. The door 532 can be opened. A person 540 can be standing next to the vehicle 530 within the space of the open door. More particularly, the person 540 can be standing next to the window 534.

The object detection and/or identification window system 100 can determine that an object is located next to the window 534, as described above. The object detection and/or identification window system 100 can identify the object as a person in any suitable manner described herein. In response to determining that the person 540 is located on one side of the window 534, the object detection and/or identification window system 100 can determine that the person is located in the closing path of the door 532. As a result, the object detection and/or identification window system 100 can cause a suitable warning to be presented and/or can prevent the door 532 from being closed.

The examples in FIGS. 5A-5C are made in connection with a vehicle. However, it will be appreciated that arrangements described herein are not intended to be limited to being used with vehicles. Indeed, arrangements described herein can be used in connection with any structure that includes a window. For instances, arrangements described herein can be used in connection with buildings, houses, or other structures.

Figure 6:
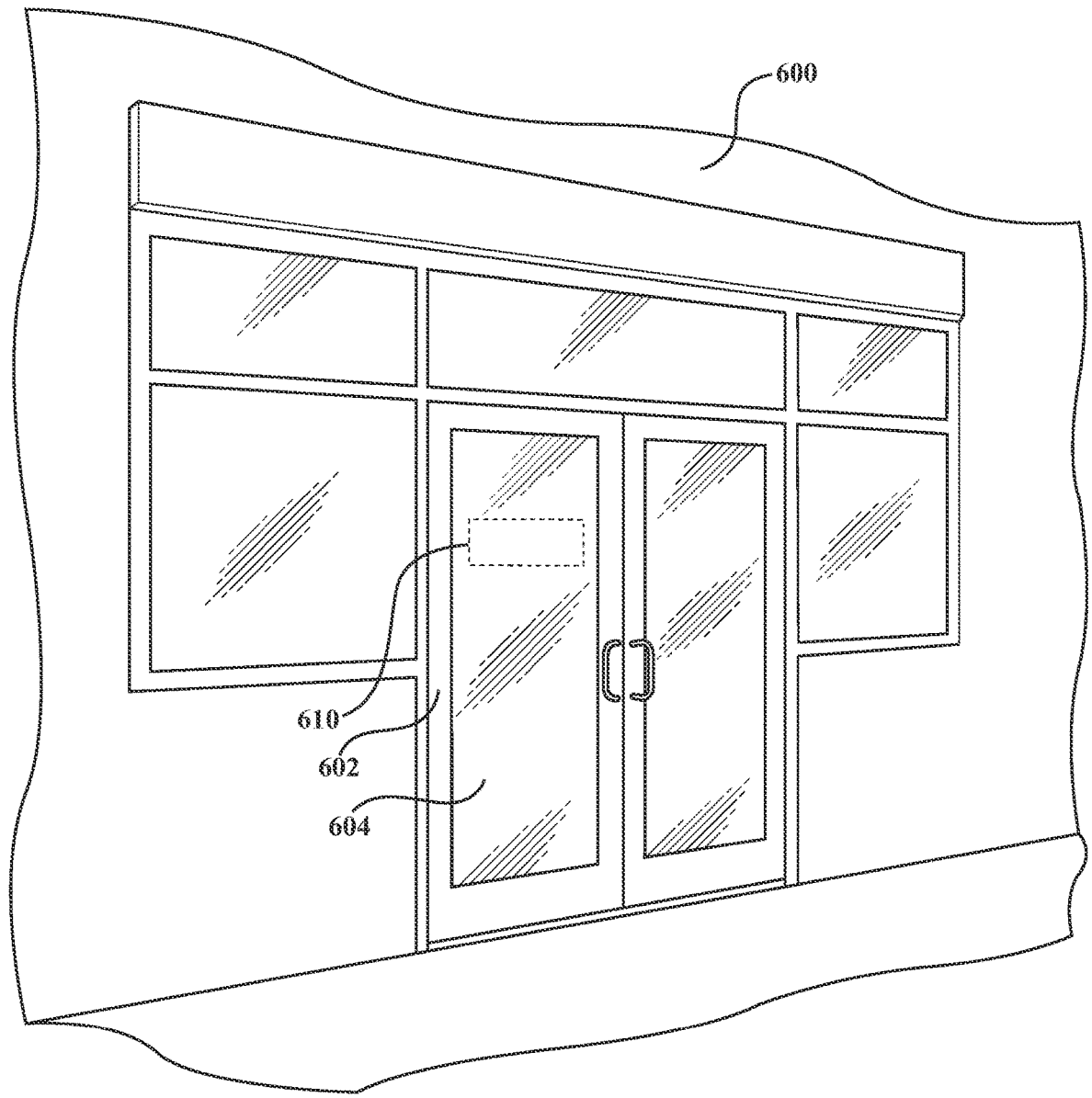
FIG. 6 is an example of a building including the window-based object detection and/or object identification system.

Referring to FIG. 6, an example of a building 600 including the window-based object detection and/or object identification window system 100 is shown. In this example, the building 600 can include a door 602. The door 602 can be include one or more transparent or translucent panels, thereby being a window 604. The window 604 can be the window 200 described above and can include the dual-sided transparent display(s) 160.

As a person approaches the door 602, the object detection and/or identification window system 100 can determine that an object is located on one side of the window 604, as described above. In some instances, the object detection and/or identification window system 100 can identify the object as a person in any suitable manner described herein. In response to determining that a person is located at or near the window 604, the object detection and/or identification window system 100 can cause the door 602 to be unlocked. In addition, the object detection and/or identification window system 100 can cause a greeting 610 to be presented on the side of the window 604 facing the person.

Referring now to FIGS. 8-11, three embodiments of the dual-sided transparent display 160 are shown. In some arrangements, the dual-sided transparent display 160 can be a dual-sided transparent display panel. The embodiments described below overcome three significant shortcomings of conventional dual-sided display panels, which are described below.

First, in some implementations, a user looking at one side of the display, in addition to seeing an image intended for him or her, can also see an image intended for a user on the opposite side of the display, and the two images may overlap and interfere with each other, impairing the clarity of the intended image. This is sometimes referred to as the "occlusion" problem. Second, in some implementations, a user looking at one side of the display, in addition to seeing an image intended for him or her, can also see a backward (horizontally flipped) image intended for a user on the opposite side of the display, causing distraction or confusion, whether the reversed image overlaps with the intended image or not. This is sometimes referred to as the "obversion" problem. Third, in some implementations, light is intentionally blocked between the two sides of the display to avoid occlusion and obversion, resulting in a dark region delineating an image intended for a user on either side of the display. This is sometimes referred to as the "obstruction" problem.

Various embodiments described herein can provide a true dual-sided transparent display panel. One principle underlying the embodiments described herein is that light propagating through a waveguide becomes visible only when it is scattered (e.g., refracted). This principle is employed in conjunction with an edge-lighted design to provide a dual-sided transparent display panel that displays images independently on both sides of the display panel without occlusion, obversion, or obstruction. That is, a user on one side of the transparent display can view an image intended for him or her at the same time another user on the opposite side of the transparent display views an image intended for that other user, and neither user sees the image (reversed or otherwise) intended for the user on the opposite side. Instead, the portions of the display panel not containing an image intended for a user looking at the applicable side of the display panel appear transparent to that user, and the same applies to a user looking at the opposite side of the display panel.

Figure 8:
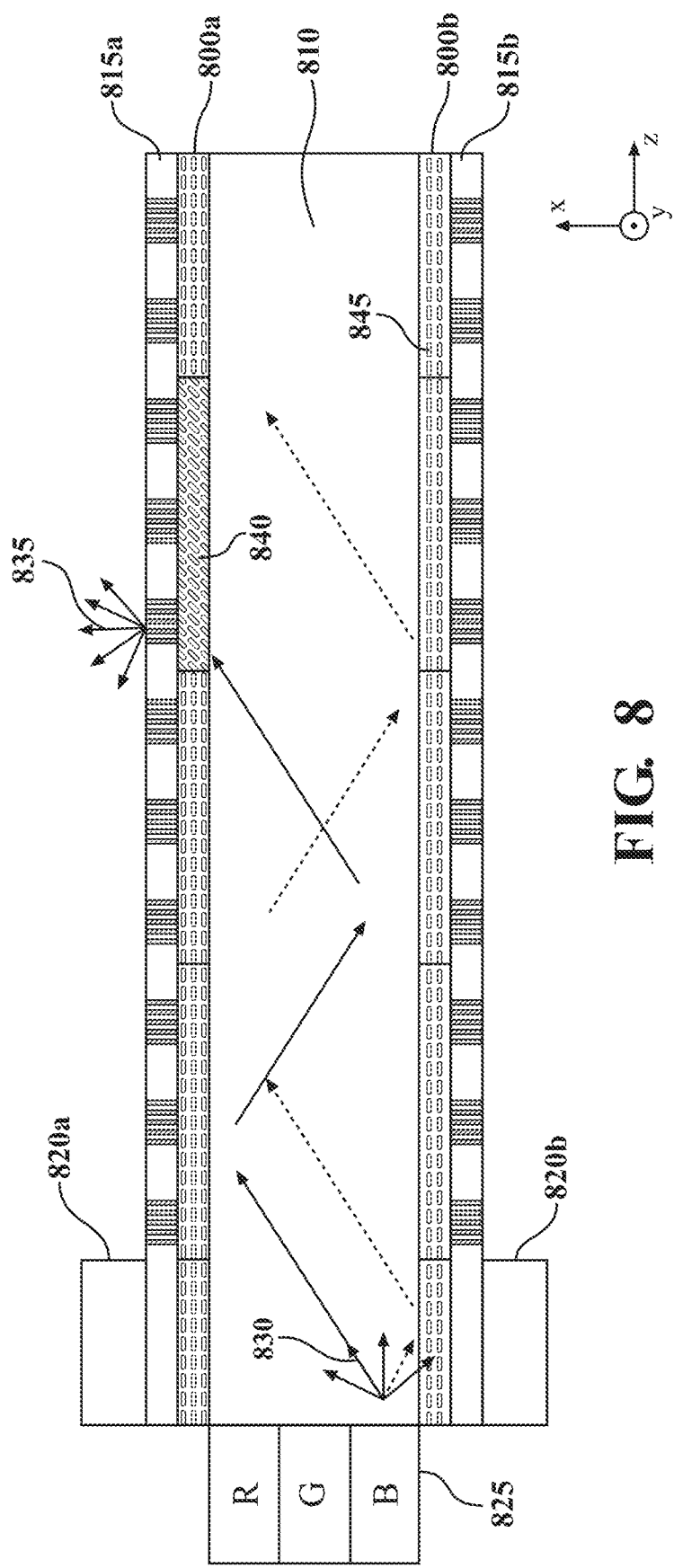
FIG. 8 is an example of a first embodiment of a dual-sided transparent display that can be used in connection with the window-based temperature determination system.

FIG. 8 is a cross-sectional diagram a first embodiment of a dual-sided transparent display panel 160. This embodiment includes a first layer of electro-optic material 800*a* and a second layer of electro-optic material 800*b*, each of which has an inner surface (the surface closest to the axis of symmetry of the waveguide 810) and an outer surface (the surface farthest from the axis of symmetry just mentioned). As shown in FIG. 8, waveguide 810 is disposed between the inner surface of the first layer of electro-optic material 800*a* and the inner surface of the second layer of electro-optic material 800*b*. In some embodiments, waveguide 810 is made of glass.

Dual-sided transparent display panel 160 also includes a first grating coating 815*a* adjacent to the outer surface of the first layer of electro-optic material 800*a* and a second grating coating 815*b* adjacent to the outer surface of the second layer of electro-optic material 800*b*. In one embodiment, the first and second grating coatings (815*a* and 815*b*) are periodic grating coatings that include alternating diffusive and plain-glass regions.

Dual-sided transparent display panel 160 also includes light sources 825 along an edge of waveguide 810 that is perpendicular to the inner and outer surfaces of the first and second layers of electro-optic material (800*a* and 800*b*). In this embodiment, the light sources include red, green, and blue light sources in accordance with the RGB standard. In some embodiments, the light sources 825 are lasers. In other embodiments, the light sources 825 are light-emitting diodes (LEDs). In one embodiment, the LEDs are Micro-LEDs. In the coordinate system shown in FIG. 8, the light sources 825 are disposed along an edge of waveguide 810 that runs in the y direction (into and out of the page) and faces the negative z direction. In the embodiment shown in FIG. 8, dual-sided transparent display panel 160 is thus edge-lighted by light sources 825.

As diagramed in FIG. 8, light emitted from light sources 825 propagates along waveguide 810 in the z direction. In this embodiment, the first layer of electro-optic material 800*a* and the second layer of electro-optic material 800*b* can be, for example, an active liquid-crystal matrix or, in a different embodiment, a passive liquid-crystal matrix. In one embodiment, the first and second layers of electro-optic material (800a and 800b) are thin-film-transistor (TFT) liquid-crystal matrices.

As those skilled in the art are aware, a liquid-crystal matrix is a special type of material that has two different refractive indices, $n_e$ (extraordinary) and $n_o$ (ordinary), depending on the electro-optical state of the material. In response to electrical control (e.g., a voltage) from driver circuitry (not shown in FIG. 8), the molecules of a liquid-crystal matrix can be caused to orient themselves in an "off" state or an "on" state. In FIG. 8, the vertical lines in first layer of electro-optic material 800a and second layer of electro-optic material 800b delineate the boundaries of rows or columns of pixels (in the y direction) in dual-sided transparent display panel 160.

Refer to the legend in FIG. 8 for the "on" and "off" states. Pixels with molecules oriented in the "off" (reflective) state 845 cause light such as the blue light 830 to be totally internally reflected within waveguide 810. The concept of total internal reflection (TIR) is well known in the waveguide-related art. As shown in FIG. 8, the oblong-shaped molecules oriented in the "off" state (845) are oriented substantially parallel to the z-axis (parallel to the direction in which light propagates within waveguide 810). Thus, a viewer looking at one of the sides of the dual-sided transparent display panel 160 in the positive or negative x direction would not see the blue light 830 at those pixel positions. Pixels with molecules oriented in the "on" (transmissive) state 840, on the other hand, are oriented at an angle relative to the z-axis, permitting light to exit waveguide 810, the blue light 830 mentioned earlier being diffused by first grating coating 815a to produce diffused and emitted blue light 835 that is visible to a user looking at dual-sided transparent display panel 160 in the negative x direction. As those skilled in the art will recognize, the individual pixels can be controlled (i.e., placed in the "on" or "off" state) using the driver circuitry mentioned above. Importantly, this can be done independently for the two sides of dual-sided transparent display panel 160 (the side facing the positive x direction and the side facing the negative x direction) to permit different images to be displayed on the two opposite sides of dual-sided transparent display panel 160 simultaneously.

As shown in FIG. 8, dual-sided transparent display panel 160 also includes first light-blocking element 820a and second light-blocking element 820b. These light-blocking elements prevent light from leaking in the x direction from a predetermined portion (e.g., a rectangular strip) of dual-sided transparent display panel 160 adjacent to the edge of waveguide 810 (the perpendicular edge mentioned above) along which light sources 825 edge-light the display panel. In other words, the light-blocking elements 820a and 820b block light that is not totally internally reflected near the edge of the waveguide 810 closest to the light sources 825. In variations of the first embodiment (the embodiment shown in FIG. 8), a different type of electro-optic material other than a liquid-crystal matrix can be used.

Figure 9A:
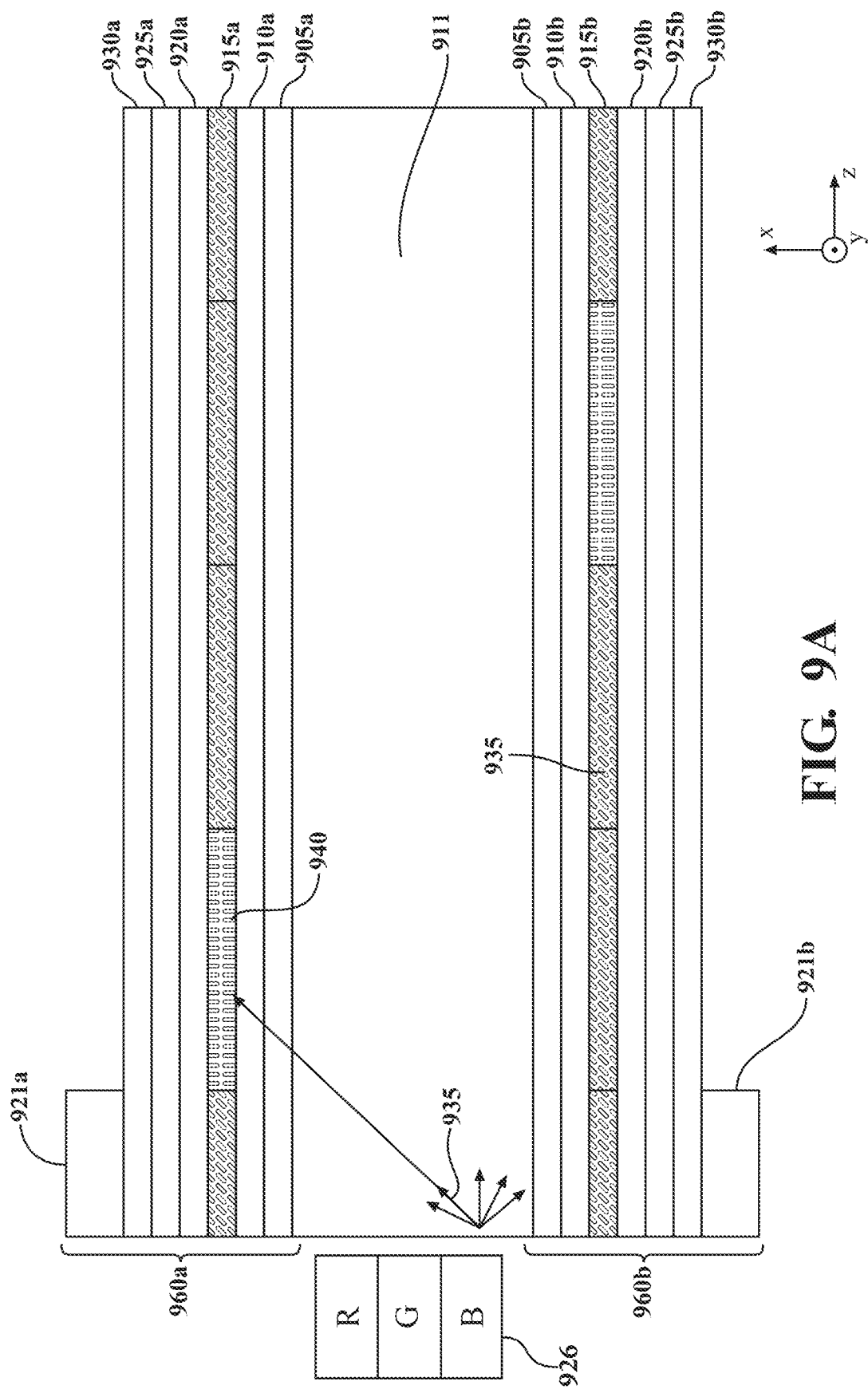
FIGS. 9A and 9B are an example of a second embodiment of a dual-sided transparent display that can be used in connection with the window-based temperature determination system.

FIG. 9A is a cross-sectional diagram of a second embodiment of a dual-sided transparent display panel 160 in an illustrative molecular configuration of the liquid-crystal matrices. In this embodiment, the first and second grating coatings 815a and 815b in the embodiment of FIG. 8 are omitted, and other layers are added to each side of the overall display panel. In this embodiment, the liquid-crystal matrices themselves are capable of scattering/diffusing light, eliminating the need for the grating coatings.

The two sides of dual-sided transparent display panel 160 may be thought of as separate panel subassemblies. A first panel subassembly 960a of dual-sided transparent display panel 160 includes a plurality of adjacent layers. Those layers, moving from the innermost layer to the outermost layer (relative to the axis of symmetry of waveguide 911) include a first electrode layer 905a, a first polyimide layer 910a, a liquid-crystal matrix 915a, a second polyimide layer 920a, a second electrode layer 925a, and a glass layer 930a. The polyimide layers (910a and 920a) are used to place the liquid-crystal molecules in the desired orientation, when they are in their passive (default) state. The specific orientations of the molecules are discussed in greater detail below. In some embodiments, the electrode layers (905a, 925a) include Indium Tin Oxide (ITO).

A second panel subassembly 960b of dual-sided transparent display panel 160 includes a plurality of adjacent layers that correspond to those in the first panel subassembly 960a. Those layers, moving from the innermost layer to the outermost layer (relative to the axis of symmetry of waveguide 911), include a first electrode layer 905b, a first polyimide layer 910b; a liquid-crystal matrix 915b; a second polyimide layer 920b; a second electrode layer 925b, and a glass layer 930b. As mentioned above, in some embodiments, the electrode layers (905b, 925b) include Indium Tin Oxide (ITO).

In this embodiment, a waveguide 911 is disposed between the inner surface of the first electrode layer 905a of the first panel subassembly 960a and the inner surface of the first electrode layer 905b of the second panel subassembly 960b. In some embodiments, waveguide 911 is made of glass, as in the embodiment shown in FIG. 8.

Dual-sided transparent display panel 160 also includes light sources 926 along an edge of waveguide 911 that is perpendicular to the inner surface of the first electrode layer 905a of the first panel subassembly 960a and the inner surface of the first electrode layer 905b of the second panel subassembly 960b. In this embodiment, the light sources 926 include RGB light sources. In some embodiments, the light sources 926 are lasers. In other embodiments, the light sources 926 are light-emitting diodes (LEDs). In the coordinate system shown in FIG. 9A, the light sources 926 are disposed along an edge of waveguide 911 that runs in the y direction (into and out of the page) and faces the negative z direction. In the embodiment shown in FIG. 9A, dual-sided transparent display panel 160 is thus edge-lighted by light sources 926.

In some embodiments, the liquid-crystal matrix in each of the panel subassemblies (960a and 960b) includes nematic liquid crystals. Refer to the legend for the "on" and "off" states in FIG. 9A. As depicted in FIG. 9A, the oblong-shaped molecules making up the nematic liquid crystals can be oriented at an angle (less than 90 degrees) relative to the positive z-axis, when in the passive or "off" state (see molecules oriented in the "off" state 945 in FIG. 9A). When the oblong-shaped molecules are in the "on" state, they are aligned approximately perpendicularly to waveguide 911 (see molecules oriented in the "on" state 940 in FIG. 9A). In the illustrative configuration of the molecules depicted in FIG. 9A, blue light 935 reaches a pixel for which the molecules are in the "on" state (940), which permits the blue light 935 to exit the first panel subassembly 960a in the positive x direction, making it visible to a user gazing toward dual-sided transparent display panel 160 in the negative x direction.

As shown in FIG. 9A, dual-sided transparent display panel 160 also includes first light-blocking element 921a and second light-blocking element 921*b*. These light-blocking elements prevent light from leaking in the x direction from a predetermined portion (e.g., a rectangular strip) of dual-sided transparent display panel 160 adjacent to the edge of waveguide 911 that is perpendicular to the inner surface of the first electrode layer 905*a* of the first panel subassembly 960*a* and the inner surface of the first electrode layer 905*b* of the second panel subassembly 960*b*— the edge of waveguide 911 along which light sources 926 edge-light the display panel. In other words, the light-blocking elements 921*a* and 921*b* block light that is not totally internally reflected near the edge of the waveguide 911 closest to the light sources 926.

Figure 9B:
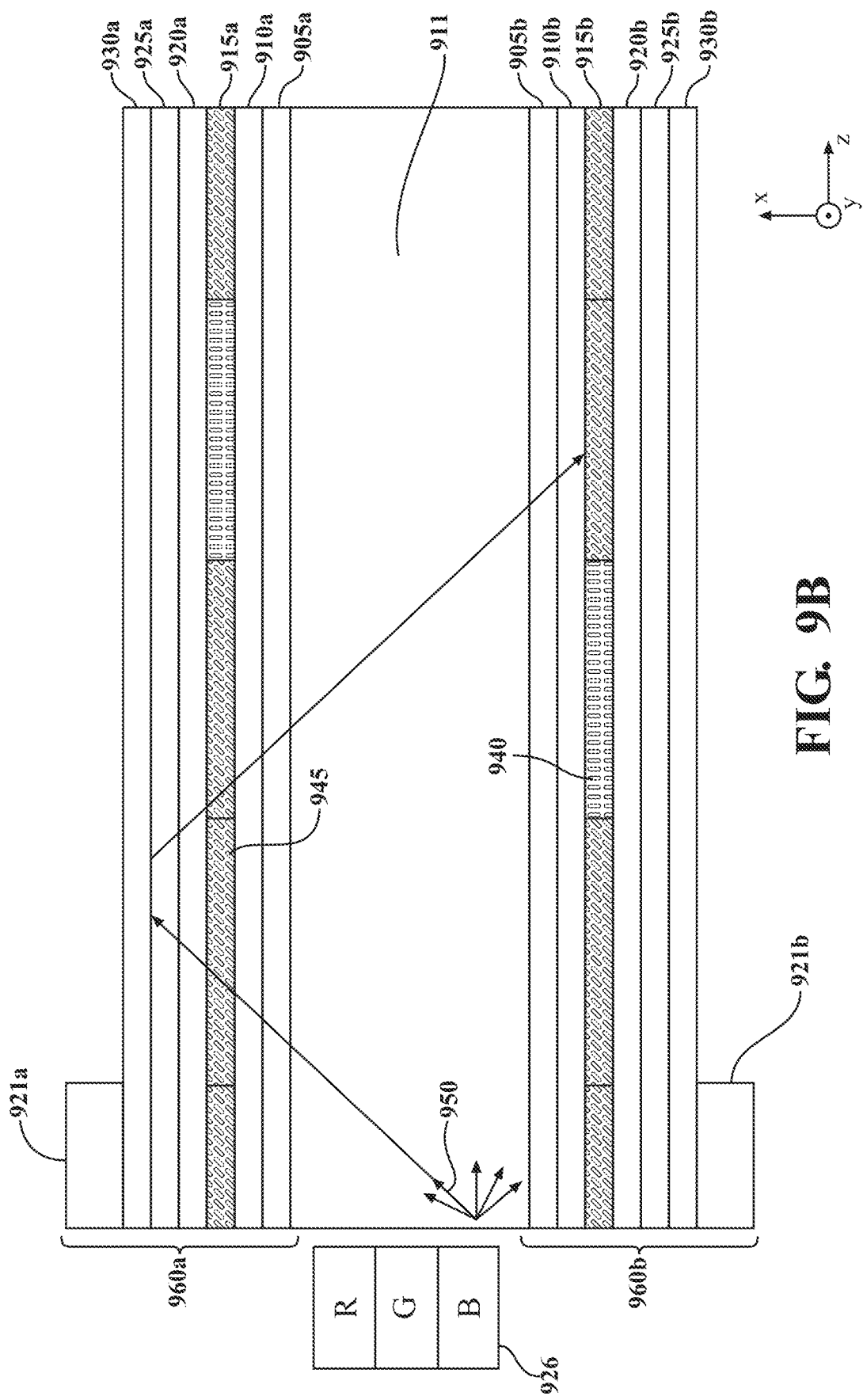

FIG. 9B is a cross-sectional diagram of a second embodiment of a dual-sided transparent display panel 160 in another illustrative molecular configuration of the liquid-crystal matrices. Refer to the legend for the "on" and "off" states in FIG. 9B. In this example, green light 950 encounters molecules in the liquid-crystal matrix 915*a* of the first panel subassembly 960*a* that are oriented in the "off" state (see molecules oriented in "off" state 945 in FIG. 9B). The orientation of those molecules (945) permits the green light 950 to propagate beyond liquid-crystal matrix 915*a* but causes the green light 950 to nevertheless be reflected within first panel subassembly 960*a* as if the dimensions of waveguide 911 were effectively expanded to encompass, e.g., the glass layer 930*a* of first panel subassembly 960*a*, as depicted in FIG. 9B. Thus, the molecules in a given panel subassembly (960*a* or 960*b*) that are oriented in the "off" state cause light from light sources 926 to be reflected by that panel subassembly toward the waveguide 911 instead of exiting that panel subassembly.

Before discussing a third embodiment of a dual-sided transparent display panel shown in FIG. 11, FIGS. 10A and 10B will be discussed to introduce some of the important principles underlying the embodiment in FIG. 11. FIG. 10A is a diagram of beam splitting using circular polarization when the molecules of a liquid-crystal substance are oriented in an "off" state, in connection with a third embodiment of a dual-sided transparent display panel. In FIG. 10A, light with two opposite circular polarizations, counterclockwise-polarized light 1020 and clockwise-polarized light 1025, enters a nematic liquid-crystal substance 1005. In FIG. 10A, the molecules 1010 are oriented in the "off" state. This causes the counterclockwise-polarized light 1020 to be diverted in the negative x direction (directed light 1030) and the clockwise-polarized light 1025 to be diverted in the opposite (positive x) direction (directed light 1035). With the molecules in this "off" configuration and the incoming light being polarized in opposite senses (clockwise and counterclockwise or right-handed and left-handed, respectively), the nematic liquid-crystal substance 1005 effectively acts as a beam splitter to direct light toward the separate sides of a dual-sided transparent display panel, depending on how the incoming light is polarized. In other words, an arrangement such as that shown in FIG. 10A exploits the chirality (or handedness) of the liquid-crystal molecules' effect on circularly polarized light, when the molecules are oriented in the "off" state.

FIG. 10B is a diagram of light passing through a liquid-crystal substance when the molecules are in an orientation corresponding to an "on" state, in connection with a third embodiment of a dual-sided transparent display panel. As shown in FIG. 10B, entering light 1040 passes through nematic liquid-crystal substance 1005 (see exiting light 1045 in FIG. 10B) without being diverted by molecules 1015 that are oriented in the "on" state. Such light will not be visible to a user looking at either side of the dual-sided transparent display panel.

FIG. 11 is a cross-sectional diagram of a third embodiment of a dual-sided transparent display panel 160. A first panel subassembly 1135*a* of dual-sided transparent display panel 160 includes a plurality of adjacent layers. Those layers, moving from the innermost layer to the outermost layer (relative to the axis of symmetry of a nematic liquid-crystal layer 1120 that acts as a waveguide) include a polyimide alignment layer 1105*a*, an electrode layer 1110*a*, and a glass layer 1115*a*.

A second panel subassembly 1135*b* of dual-sided transparent display panel 160 includes a plurality of layers that correspond to those in first panel subassembly 1135*a*. Those layers, moving from the innermost layer to the outermost layer (relative to the axis of symmetry of nematic liquid-crystal layer 1120) include a polyimide alignment layer 1105*b*, an electrode layer 1110*b*, and a glass layer 1115*b*. In some embodiments, the electrode layers (1110*a* and 1110*b*) in the two panel subassemblies include Indium Tin Oxide (ITO).

As shown in FIG. 10, nematic liquid-crystal layer 1120 is disposed between the inner surface of the polyimide alignment layer 1105*a* of the first panel subassembly 1135*a* and the inner surface of the polyimide alignment layer 1105*b* of the second panel subassembly 1135*b*. In a different embodiment, cholesteric liquid crystals are used instead of nematic liquid crystals. As discussed above, this layer acts as a waveguide with reorientable molecules within it (refer to the discussion of FIGS. 10A and 10B above) that direct, toward the glass layer 1115*a* of the first panel subassembly 1135*a*, light 1125 from one or more light sources that is circularly polarized in a first sense and that direct, toward the glass layer 1115*b* of the second panel subassembly, light 1125 that is circularly polarized in a second sense that is opposite the first sense. As discussed above, the two opposite senses for circular polarization are clockwise and counterclockwise (also sometimes called right-handed and left-handed circular polarization, respectively). Though not shown in FIG. 11, the light sources for edge-lighting of the dual-sided transparent display panel can be similar, in this embodiment, to those discussed above in connection with FIGS. 8, 9A, and 9B (the first and second embodiments). In some variations of the embodiment shown in FIG. 11, a different type of liquid-crystal layer other than a nematic liquid-crystal layer can be employed.

In the embodiment shown in FIG. 11, the nematic liquid-crystal layer 1120 acts as a waveguide containing reorientable molecules that, in the "off" state, can divert light to a specific one of the two sides of a dual-sided transparent display panel, depending on the sense of the entering circularly polarized light. The driver circuitry, in this embodiment, can control both the state ("on" or "off") of the molecules associated with individual pixels and the polarization of the light emitted at the edge of nematic liquid-crystal layer 1120 from one or more light sources, such as the light sources 825, 926 shown in FIGS. 8, 9A, and 9B. In some embodiments, a single light emitter is used, and the polarization is switched as needed over time to support a dual-sided transparent display panel, but in other embodiments, two emitters (one for each side of the dual-sided transparent display panel) are used. Some possible methods to switch polarizations could include photo elastic modulators, variable retarders (also known as variable wave plates), or fast-switching wave plates. In some embodiments, use can be made of diodes that emit circular polarizations from the light source itself.

In the various embodiments discussed above, the refresh cycle of a typical liquid-crystal matrix can be reduced by a factor of three in order to account for the different colors emitted by the light sources 825, 926. Mixed colors or multiple colors can be emitted by overlapping the time frames of how long the liquid-crystal matrix is open. One possible order is R, then G, then B. A purple pixel can be created, for example, by mixing red and blue light. Therefore, the length of time the pixel is "scattering light to a viewer/user" will vary the hue of the purple color. To mix red and blue evenly, the activation time should be equal for the two colors. Also, different types of liquid crystals can be used, depending on the particular embodiment, to achieve different effects. Cholesteric liquid crystals can be used to change the refractive index. This abrupt change in refractive index can cause deflection or scattering out of the flat display panel because of its poly-domain structure.

Further, it will be appreciated that the above-described embodiments of the dual-sided transparent display are not the only configurations that can be used. Indeed, additional examples of the dual-sided transparent display can include any of those disclosed in U.S. patent application Ser. No. 16/897,577, which is incorporated herein by reference in its entirety.

It will be appreciated that arrangements described herein can provide numerous benefits, including one or more of the benefits mentioned herein. Arrangements described herein can expand the uses of a window. For example, arrangements described herein can detect one or more objects located on one or both sides of a window. Arrangements described herein can identify objects located near the window. When the window is part of a door, arrangements described herein can prevent a door from being opened and striking a person, animal, or object located in the opening path of the door. When the window is part of a door, arrangements described herein can prevent a door from being closed upon a person, animal, or object located in the closing path of the door. Arrangements described herein can avoid damage to the window, door, or any person, anima, or object located near the window. Arrangements described herein can improve safety in any vehicle or structure that includes a window. Arrangements described herein can present messages, warnings, alerts, or greetings to a person using the window.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A system for window-based object detection and/or identification, comprising:
    a window, the window including a first side and a second side, the first side being a first major face of the window, the second side being a second major face of the window, the first side being opposite the second side, the window including an optical grating operatively positioned on the first side;
    a light source operatively positioned on the first side and configured to emit light toward the optical grating;
    a detector operatively positioned on the first side and operatively positioned to acquire spectroscopic data of the light emitted from the light source after the light has interacted with the optical grating; and
    a processor operatively connected to the detector, wherein the processor is configured to:
        determine a temperature based on the spectroscopic data; and
        determine, based on the temperature, whether an object is located on the first side of the window.

2. The system of claim 1, wherein the optical grating is a Bragg grating, the Bragg grating having a coefficient of thermal expansion, whereby thermal expansion or contraction of the Bragg grating causes a change in the spectroscopic data of the light that has interacted with the Bragg grating.

3. The system of claim 1, wherein the window is part of a structure, and wherein the structure is a vehicle or a building.

4. The system of claim 1, wherein the processor is further configured to:
    identify the object on the first side of the window based on the temperature or a temperature pattern.

5. The system of claim 1, wherein a display is integrated into at least a portion of the window, and wherein the processor is further configured to:
    responsive to determining that an object is located on the first side of the window, causing a message, a warning, or a greeting to be presented on the display.

6. The system of claim 1, wherein the processor is further configured to:
    responsive to determining that an object is located on the first side of the window, causing a greeting to be presented on the first side of the window.

7. The system of claim 1, wherein the window is part of a door, and wherein the processor is further configured to:
    responsive to determining that an object is located on the first side of the window, causing the door to be unlocked.

8. The system of claim 1, wherein the window is part of a door, and wherein the processor is further configured to:
    responsive to determining that an object is located on the first side of the window, determine whether the object is located in an opening path or a closing path of the door; and
    responsive to determining that the object is located in the opening path or the closing path of the door, causing one of: control a movement of door or present a warning on the first side of the window.

9. The system of claim 1, wherein determine, based on the temperature, whether an object on the first side of the window includes:
    comparing the temperature to an ambient temperature or an expected temperature; and
    when a difference between the temperature and the ambient temperature or the expected temperature exceeds a temperature differential threshold, then an object is determined to be located on the first side of the window.

10. The system of claim 8, wherein the optical grating is a first optical grating, wherein the light source is a first light source, wherein the detector is a first detector, wherein the temperature is a first temperature, wherein the window includes a second optical grating operatively positioned with respect to the second side, and further including:
    a second light source configured to emit light toward the second optical grating; and
    a second detector operatively positioned to acquire second spectroscopic data of the light emitted from the second light source after the light has interacted with the second optical grating,
    wherein the processor is further configured to:
        determine a second temperature based on the second spectroscopic data; and
        determine, based on the temperature, whether an object is located on the second side of the window.

11. The system of claim 1, wherein the optical grating is a plurality of optical gratings, wherein the plurality of optical gratings being distributed in a row, wherein the light source is a plurality of light sources configured to emit light toward a respective one of the plurality of optical gratings, wherein the detector is a plurality of detectors, and wherein the plurality of detectors are operatively positioned to acquire spectroscopic data of the light emitted from a respective one of the plurality of light sources after the light has interacted with one of the plurality of optical gratings, and wherein the processor is operatively connected to the plurality of detectors.

12. The system of claim 11, wherein the processor is further configured to:
    determine a plurality of temperatures based on the spectroscopic data received from each of the plurality of detectors;
    determine, based on the plurality of temperatures, whether an object is located on the first side of the window; and
    generate a thermal map using the plurality of temperatures.

13. The system of claim 12, wherein the processor is further configured to:
    identify the object based on the plurality of temperatures or the thermal map.

14. A method for window-based object detection and/or identification, a window having a first side and a second side, the first side being a first major face of the window, the second side being a second major face of the window, an optical grating operatively positioned on the first side of the window, a light source operatively positioned on the first side and configured to emit light toward the optical grating, a detector operatively positioned on the first side and operatively positioned to acquire spectroscopic data of the light emitted from the light source after the light has interacted with the optical grating, the method comprising:

determining, using the optical grating, a temperature at or near the first side of the window; and determining, based on the temperature, whether an object is located on the first side of the window.

15. The method of claim 14, further including:

detecting spectroscopic data of light after having interacted with the optical grating, wherein determining the temperature at or near the first side of the window includes:

comparing the detected spectroscopic data of the light after having interacted with the optical grating to wavelength-temperature dependence data.

16. The method of claim 14, wherein determining, based on the temperature, whether an object is located on the first side of the window includes:

comparing the temperature to an ambient temperature or an expected temperature; and when the temperature differs from the ambient temperature or the expected temperature, then an object is determined to be located on the first side of the window.

17. The method of claim 14, wherein the optical grating is a Bragg grating, the Bragg grating having a coefficient of thermal expansion, whereby thermal expansion or contraction of the Bragg grating causes a change in the spectroscopic data of the light that has interacted with the Bragg grating.

18. The method of claim 14, further including:

responsive to determining that an object is located on the first side of the window, one of:

causing a greeting to be presented on the first side of the window; and causing a warning to be presented on the first side of the window.

19. The method of claim 14, wherein the window is part of a door, and further including:

responsive to determining that an object is located on the first side of the window, determining whether the object is located in an opening path or a closing path of the door;

responsive to determining that the object is located in the opening path or the closing path of the door, one of:

controlling a movement of the door; and causing the door to be locked or unlocked.

20. The method of claim 14, further including:

identifying the object on the first side of the window based on the temperature or a temperature pattern.

\* \* \* \* \*